United States Patent
Yang et al.

(10) Patent No.: US 10,554,745 B2
(45) Date of Patent: Feb. 4, 2020

(54) METHOD AND APPARATUS FOR MANAGING CONNECTION BETWEEN BROADCASTING RECEPTION DEVICE AND ANOTHER DEVICE WHICH ARE CONNECTED THROUGH NETWORK

(71) Applicant: LG ELECTRONICS INC., Seoul (KR)

(72) Inventors: Seungryul Yang, Seoul (KR); Donghyun Kang, Seoul (KR); Kyoungsoo Moon, Seoul (KR); Seungjoo An, Seoul (KR); Jinwon Lee, Seoul (KR); Jinpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 447 days.

(21) Appl. No.: 15/111,756

(22) PCT Filed: Jan. 13, 2015

(86) PCT No.: PCT/KR2015/000347
§ 371 (c)(1),
(2) Date: Jul. 14, 2016

(87) PCT Pub. No.: WO2015/108319
PCT Pub. Date: Jul. 23, 2015

(65) Prior Publication Data
US 2016/0337449 A1 Nov. 17, 2016

Related U.S. Application Data

(60) Provisional application No. 61/927,455, filed on Jan. 14, 2014, provisional application No. 61/938,163, (Continued)

(51) Int. Cl.
*G06F 16/10* (2019.01)
*H04L 29/08* (2006.01)
*H04L 29/06* (2006.01)

(52) U.S. Cl.
CPC ...... *H04L 67/1095* (2013.01); *H04L 65/4076* (2013.01); *H04L 67/02* (2013.01); *H04L 67/141* (2013.01)

(58) Field of Classification Search
None
See application file for complete search history.

(56) References Cited

U.S. PATENT DOCUMENTS

2004/0054754 A1* 3/2004 Hwang ............... G06F 16/955
709/217
2004/0215669 A1 10/2004 Mettala et al.
(Continued)

FOREIGN PATENT DOCUMENTS

JP 2008-252422 A 10/2008
JP 2011-166441 A 8/2011
(Continued)

*Primary Examiner* — Hamza N Algibhah
*Assistant Examiner* — Tony Williams
(74) *Attorney, Agent, or Firm* — Birch, Stewart, Kolasch & Birch, LLP

(57) ABSTRACT

An embodiment of the present invention provides a method for providing a service between applications of a companion device and a broadcast reception device connected over a network, the method comprising: transmitting a request message for obtaining application information to the broadcast reception device; and receiving a response message including the application information from the broadcast reception device in response to the request message, wherein the application information includes address information for communication between the application of the companion device and the application of the broadcast reception device (Continued)

and synchronization address information for synchronization between the companion device and the broadcast reception device.

10 Claims, 46 Drawing Sheets

Related U.S. Application Data filed on Feb. 11, 2014, provisional application No. 61/939,716, filed on Feb. 13, 2014.

(56) References Cited

U.S. PATENT DOCUMENTS

| | | | | |
|---|---|---|---|---|
| 2011/0177774 | A1* | 7/2011 | Gupta | H04H 20/93 455/3.06 |
| 2012/0070090 | A1* | 3/2012 | Chang | G06K 9/00 382/218 |
| 2012/0084802 | A1* | 4/2012 | Kitazato | H04H 60/13 725/14 |
| 2012/0144423 | A1* | 6/2012 | Kim | H04N 21/47 725/39 |
| 2012/0173665 | A1 | 7/2012 | Oh | |
| 2012/0210238 | A1* | 8/2012 | McCoy | G06F 9/452 715/738 |
| 2013/0007827 | A1 | 1/2013 | Adam et al. | |
| 2013/0047180 | A1* | 2/2013 | Moon | H04N 21/4122 725/30 |
| 2013/0166580 | A1* | 6/2013 | Maharajh | H04L 65/605 707/758 |
| 2013/0246905 | A1 | 9/2013 | Isozaki | |
| 2013/0271653 | A1* | 10/2013 | Kim | H04N 21/8458 348/473 |
| 2013/0298169 | A1* | 11/2013 | Wells | H04H 20/91 725/61 |

FOREIGN PATENT DOCUMENTS

| | | |
|---|---|---|
| JP | 2012-74771 A | 4/2012 |
| JP | 2013-66159 A | 4/2013 |
| JP | 2013-197861 A | 9/2013 |
| JP | 2015-70517 A | 4/2015 |
| KR | 10-2004-0007474 A | 1/2004 |
| KR | 10-1141163 B1 | 5/2012 |
| KR | 10-2012-0068314 A | 6/2012 |
| KR | 10-2013-0004071 A | 1/2013 |
| KR | 10-2013-0124183 A | 11/2013 |
| KR | 10-2014-0004131 A | 1/2014 |
| WO | WO 2014-050733 A1 | 4/2014 |

* cited by examiner

FIG. 3

| DCP (308) | | | |
|---|---|---|---|
| SSDP (303) | GENA (304) | SOAP (306) | DDD/SCP (307) |
| | | HTTP (305) | |
| UDP (301) | TCP (302) | | |

FIG. 8

| | Response code | Description |
|---|---|---|
| (S810) | 201 Running | Application has been successfully executed |
| (S820) | 401 Unauthorized | Application is unable to be launched by user |
| (S830) | 403 Forbidden | Application is unable to be launched by device |
| (S840) | 500 Error | Application is unable to be launched due to state of device |

FIG. 9

```
<device> (S910)
    <deviceType>urn:schemas-upnp-org:device:MainDevice/ScreenDevice/CompanionDevice:version </deviceType>
    ......
    <serviceList>
        <service> (S920)
            <serviceType>urn:schemas-upnp-org:service:ApplicationManagement:version </serviceType>
            <serviceId>urn:upnp-org:serviceId: ApplicationManagement </serviceId>
            <SCPDURL>URL to service description</SCPDURL>
            <controlURL>URL for control</controlURL>
            <eventSubURL>URL for eventing</eventSubURL>
        </service>
        <service> (S930)
            <serviceType>urn:schemas-upnp-org:service: ConnectionEstablishment:version </serviceType>
            <serviceId>urn:upnp-org:serviceId:ConnectionEstablishment:</serviceId >
            <SCPDURL>URL to service description</SCPDURL>
            <controlURL>URL for control</controlURL>
            <eventSubURL>URL for eventing</eventSubURL>
            <ApptoAppConnectionAddress (or ApptoAppEndPoint)>URL for App-to-App Connection (S940)
            </ApptoAppConnectionAddress (or ApptoAppEndPoint)>
            <SystemSyncEndPoint>URL for System Synchronization (S950)
            </SystemSyncEndPoint>
            <ContentSyncEndPoint>URL for Content Synchronization (S960)
            </ContentSyncEndPoint>
        </service>

</serviceList>
```

FIG. 10

```
<device>
    <deviceType>urn:schemas-upnp-org:device:MainDevice/ScreenDevice/CompanionDevice (S1010):
    version</deviceType>
    <ApptoAppConnectionAddress(or ApptoAppEndPoint)>URL for App-to-App Connection (S1020)
    </ApptoAppConnectionAddress(or ApptoAppEndPoint)>
    <SystemSyncEndPoint>URL for System Synchronization (S1030)
    </SystemSyncEndPoint>
    <ContentSyncEndPoint>URL for Content Synchronization (S1040)
    </ContentSyncEndPoint>
```

FIG. 11

```
<device>
    <deviceType>urn:schemas-upnp-org:device:MainDevice/ScreenDevice/CompanionDevice:version</deviceType>
    <AppLaunchAddress> URL for Launching/Stopping/Monitoring </AppLaunchAddress>(S1110)
    <ApptoAppConnectionAddress (or ApptoAppEndPoint)>URL for App-to-App Connection
    </ApptoAppConnectionAddress (or ApptoAppEndPoint)>
    <SystemSyncEndPoint>URL for System Synchronization
    </SystemSyncEndPoint>
    <ContentSyncEndPoint>URL for Content Synchronization
    </ContentSyncEndPoint>
```

FIG. 12

```
<device>
<deviceType>urn:hbbtv:device:HbbTVDevice:2</deviceType>
<friendlyName>Short user-friendly title</friendlyName>
<manufacturer>Manufacturer's name</manufacturer>
<modelName>Model name</modelName>
<UDN>Unique Device Name</UDN>
<serviceList>
<service>
<serviceType>urn:hbbtv:service:HbbTVCompanionScreen:1</serviceType>
<serviceId></serviceId>
<SCPDURL></SCPDURL>
<controlURL></controlURL>
<eventSubURL></eventSubURL>
<X_HbbTV_App2AppURL xmlns="urn:hbbtv:HbbTVCompanionScreen">
URL of App2App communication service endpoint (S1210)
</X_HbbTV_App2AppURL>
<X_HbbTV_MediaSyncURL xmlns="urn:hbbtv:HbbTVCompanionScreen">
URL of Media Sychronisation communication service endpoint (S1220)
</X_HbbTV_MediaSyncURL>
<X_HbbTV_TimeSyncURL xmlns="urn:hbbtv:HbbTVCompanionScreen">
URL of Time Sychronisation communication service endpoint (S1230)
</X_HbbTV_TimeSyncURL>
<X_HbbTV_AppLaunchURL xmlns="urn:hbbtv:HbbTVCompanionScreen">
URL of Application Launch service endpoint (S1240)
</X_HbbTV_AppLaunchURL>
</service>
</serviceList>
</device>
```

FIG. 13

```
<device>
<deviceType>urn:hbbtv:device:HbbTVDevice:2</deviceType>
<friendlyName>Short user-friendly title</friendlyName>
<manufacturer>Manufacturer's name</manufacturer>
<modelName>Model name</modelName>
<UDN>Unique Device Name</UDN>
<X_HbbTV_App2AppURL xmlns= "urn:hbbtv:HbbTVCompanionScreen ">
URL of App2App communication service endpoint (S1310)
</X_HbbTV_App2AppURL>
<X_HbbTV_MediaSyncURL xmlns= "urn:hbbtv:HbbTVCompanionScreen ">
URL of Media Sychronisation communication service endpoint (S1320)
</X_HbbTV_MediaSyncURL>
<X_HbbTV_TimeSyncURL xmlns= "urn:hbbtv:HbbTVCompanionScreen ">
URL of Time Sychronisation communication service endpoint (S1330)
</X_HbbTV_TimeSyncURL>
<X_HbbTV_AppLaunchURL xmlns= "urn:hbbtv:HbbTVCompanionScreen ">
URL of Application Launch service endpoint (S1340)
</X_HbbTV_AppLaunchURL>
</device>
```

FIG. 27

|  | Action Name |
|---|---|
| 2700 | SearchAppInfo() or GetAppInfo() |

|  | Argument | Direction |
|---|---|---|
| 2710 | AppID | IN |
| 2720 | RetrieveCriteria | IN |
| 2730 | DeviceProfile | IN |
| 2740 | Filter | IN |
| 2750 | AppInfo | OUT |

FIG. 28

|      | Action Name      |
|------|------------------|
| 2800 | SimpleGetAppInfo() |

|      | Argument | Direction |
|------|----------|-----------|
| 2810 | AppID    | IN        |
| 2820 | AppInfo  | OUT       |

FIG. 29

|  | Action Name |
|---|---|
| 2900 | GetAvailableApp() |

|  | Argument | Direction |
|---|---|---|
| 2910 | AppID | IN |
| 2920 | RetrieveCriteria | IN |
| 2930 | DeviceProfile | IN |
| 2940 | Filter | IN |
| 2950 | AvailableApp | OUT |

FIG. 30

|  | Action Name |
|---|---|
| 3000 | GetRunningApp() |

|  | Argument | Direction |
|---|---|---|
| 3010 | RunningAppInfo | OUT |

FIG. 31

|  | Action Name |
|---|---|
| 3100 | GetRunningStatus() |

|  | Argument | Direction |
|---|---|---|
| 3110 | AppID | IN |
| 3120 | RunningStatus | OUT |

FIG. 32

|      | Action Name       |
|------|-------------------|
| 3200 | ActivateAppByID() |

|      | Argument  | Direction |
|------|-----------|-----------|
| 3210 | AppID     | IN        |
| 3220 | Parameter | IN        |

FIG. 33

|      | Action Name       |
|------|-------------------|
| 3300 | ActivateAppByURI() |

|      | Argument      | Direction |
|------|---------------|-----------|
| 3310 | ActivationURI | IN        |
| 3320 | AppInfo       | IN        |
| 3330 | Parameter     | IN        |
| 3340 | AppID         | OUT       |

FIG. 34

|  | Action Name |
|---|---|
| 3400 | DeactivateApp() |

|  | Argument | Direction |
|---|---|---|
| 3410 | AppIDs | IN |
| 3420 | StoppedAppIDs | OUT |

FIG. 35

|  | Action Name |
|---|---|
| 3500 | InstallAppByID() |

|  | Argument | Direction |
|---|---|---|
| 3510 | AppID | IN |
| 3520 | Parameter | IN |

FIG. 36

| | Action Name |
|---|---|
| 3600 | InstallAppByURI() |

| | Argument | Direction |
|---|---|---|
| 3610 | InstallationURI | IN |
| 3620 | AppInfo | IN |
| 3630 | Parameter | IN |
| 3640 | AppID | OUT |

FIG. 37

|      | Action Name    |
|------|----------------|
| 3700 | UninstallApp() |

|      | Argument        | Direction |
|------|-----------------|-----------|
| 3710 | AppID           | IN        |
| 3720 | UnintalledAppIDs | OUT      |

FIG. 38

|  | Action Name |
|---|---|
| 3800 | GetAppInstallationStatus() |

|  | Argument | Direction |
|---|---|---|
| 3810 | AppIDs | IN |
| 3820 | InstallationStatus | OUT |

FIG. 39

|  | Action Name |
|---|---|
| 3900 | GetAppConnectionInfo() |

|  | Argument | Direction |
|---|---|---|
| 3910 | AppIDs | IN |
| 3920 | ConnectionInfo | OUT |

FIG. 40

|  | Action Name |
|---|---|
| 4000 | ConnectApptoApp() |

|  | Argument | Direction |
|---|---|---|
| 4010 | AppID | IN |
| 4020 | ConnectionID | OUT |

FIG. 41

|  | Action Name |
|---|---|
| 4100 | DisconnectApptoApp() |

|  | Argument | Direction |
|---|---|---|
| 4110 | ConnectionIDs | IN |
| 4120 | DisconnectedConnectionIDs | OUT |

FIG. 42

| | Action Name |
|---|---|
| 4200 | GetCurrentConnectionInfo() |

| | Argument | Direction |
|---|---|---|
| 4210 | ConnectionIDs | IN |
| 4220 | ConnectionAppIDs | OUT |

FIG. 43

| | Action Name |
|---|---|
| 4300 | GetSupportedTargetFields() |

| | Argument | Direction |
|---|---|---|
| 4310 | SupportedTargetFields | OUT |

FIG. 44

| | State Variable name | Data type |
|---|---|---|
| 4401 | AppInfoList | string |
| 4402 | MSSAvailableApp | string |
| 4403 | SupportedTargetFields | string |
| 4404 | A_ARG_TYPE_AppID | string |
| 4405 | A_ARG_TYPE_Target | string |
| 4406 | A_ARG_TYPE_TargetFields | string |
| 4407 | A_ARG_TYPE_Filter | string |
| 4408 | RunningAppList | string |
| 4409 | A_ARG_TYPE_URI | string |
| 4410 | A_ARG_TYPE_Parameters | string |
| 4411 | A_ARG_TYPE_ConnectionIDs | string |

METHOD AND APPARATUS FOR MANAGING CONNECTION BETWEEN BROADCASTING RECEPTION DEVICE AND ANOTHER DEVICE WHICH ARE CONNECTED THROUGH NETWORK

CROSS REFERENCE TO RELATED APPLICATIONS:

This application is the National Phase of PCT International Application No. PCT/KR2015/000347, filed on Jan. 13, 2015, which claims priority under 35 U.S.C. 119(e) to U.S. Provisional Application Nos. 61/927,455, filed on Jan. 14, 2014, 61/938,163, filed on Feb. 11, 2014, and 61/939,716 filed on Feb. 13, 2014, all of which are hereby expressly incorporated by reference into the present application.

TECHNICAL FIELD

The present invention relates to a method and apparatus for managing a connection between a plurality of devices connected over a network and, more particularly, to a method and apparatus for managing applications and establishing a connection between applications in order to provide an interactive service between a broadcasting reception device and another device.

BACKGROUND ART

Unlike in analog broadcasting, in digital broadcasting, one broadcasting service may include a plurality of media components. Accordingly, users can selectively watch a plurality of media for the one broadcasting service.

Furthermore, a user can be provided with various kinds of services in addition to a broadcasting service and can improve efficiency of device control through interoperability between different devices connected to a device that receives a broadcasting service over a network.

In a related art, however, inefficiency in the provision of services is present because a specific kind of service based on a specific technology must be defined according to a standard protocol in order to guarantee compatibility between different devices connected over a network. Accordingly, there is a need for a method capable of providing various kinds of services in addition to a broadcasting service even without a protocol for interoperability between devices connected over a network.

DISCLOSURE

Technical Problem

An embodiment of the present invention provides a method for providing a broadcasting content service through a reception apparatus of an IP-based next-generation hybrid broadcasting system.

An embodiment of the present invention provides a method for providing an interactive service between a broadcasting reception device and another device connected over a network.

Furthermore, an embodiment of the present invention provides a method for providing an interactive service by implementing an interactive service so that a plurality of devices connected over a network always runs the interactive service.

Furthermore, an embodiment of the present invention provides a method for providing an interactive service by enabling a device to notify a user that what application needs to be installed and executed.

Furthermore, an embodiment of the present invention provides a method for enabling the management of an application of the other device, such as installation, running, running stop, and uninstallation, through one device.

Furthermore, an embodiment of the present invention provides a method for enabling a permitted specific user or device only to manage an application of another device.

Furthermore, an embodiment of the present invention provides a method for sharing information for an interaction between applications of a plurality of devices.

Furthermore, an embodiment of the present invention provides a method capable of simultaneously supporting connections between a plurality of devices by identifying the connections between the plurality of devices.

Furthermore, an embodiment of the present invention provides a device synchronization, a time synchronization or content synchronization method in order to provide an interactive service between a plurality of devices.

Furthermore, an embodiment of the present invention provides a method for discovering a device supporting the management, connection management, and synchronization of applications of a plurality of devices.

Furthermore, an embodiment of the present invention provides a method for exchanging additional information about the management, connection management, and synchronization service of applications of a plurality of devices.

Technical Solution

The present invention provides a method for providing a service between applications of a companion device and a broadcast reception device connected over a network, including the steps of transmitting a request message for obtaining application information to the broadcast reception device and receiving a response message including the application information from the broadcast reception device in response to the request message, wherein the application information includes address information for communication between the application of the companion device and the application of the broadcast reception device and sync address information for synch between the companion device and the broadcast reception device.

In the present invention, the method is performed if the companion device controls the application of the broadcast reception device so that the application is launched or if the application of the companion device is launched regardless of the application of the broadcast reception device.

In the present invention, the address information App-toAppURL for the communication between the application of the companion device and the application of the broadcast reception device is indicative of a websocket server URL.

In the present invention, the application information is included in description information of an XML format.

In the present invention, the broadcast reception device receives a broadcast signal through at least one of broadcast and a broadband, and the broadcast signal includes at least one of media content, application data, an application information table, and a stream event.

The present invention provides a method for providing a service between applications of a companion device and a broadcast reception device connected over a network, including the steps of obtaining an application address of the broadcast reception device; transmitting a request message which requests an execution of the application of the broadcast reception device to the application address of the broadcast reception device; and receiving a response message from the broadcast reception device in response to the request message, the response message includes code information indicative of the state of the execution of the application.

In the present invention, the code information includes at least one of first code information indicating that the application has been executed, second code information indicating that the application is unable to be executed by a user, third code information indicating that the application is unable to be executed by the broadcast reception device, and fourth code information indicating that the application is unable to be executed due to the state of the broadcast reception device.

In the present invention, the body data of the request message includes an application identifier and application description information.

In the present invention, the application description information includes control code information including at least one of a launch, a stop, and monitoring.

In the present invention, the broadcast reception device receives a broadcast signal through at least one of broadcast and a broadband, and the broadcast signal includes at least one of media content, application data, an application information table, and a stream event.

The present invention provides a companion device managing a connection with a broadcast reception device over a network, including a network interface which performs communication with the broadcast reception device and a controller which transmits a request message for obtaining application information to the broadcast reception device and receives a response message including the application information from the broadcast reception device in response to the request message, wherein the application information includes address information for communication between the application of the companion device and the application of the broadcast reception device and sync address information for synch between the companion device and the broadcast reception device.

In the present invention, the controller is executed if the companion device controls the application of the broadcast reception device so that the application is launched or if the application of the companion device is launched regardless of the application of the broadcast reception device.

The present invention provides a companion device managing a connection with a broadcast reception device over a network, including a network interface which performs communication with the broadcast reception device and a controller which obtains an application address of the broadcast reception device, transmits a request message which requests an execution of the application of the broadcast reception device to the application address of the broadcast reception device, and receives a response message from the broadcast reception device in response to the request message, wherein the response message includes code information indicative of the state of the execution of the application.

Advantageous Effects

In accordance with an embodiment of the present invention, in order to interoperate a new type of service between devices connected over a network in addition to a next-generation broadcasting service, the corresponding service itself does not need to be standardized. Inefficiency in which all of basic protocols for interoperability between devices other than a function unique to a service have to be included in the corresponding service itself can be obviated. Accordingly, everybody can easily provide an interactive service in an application form, and a manufacturer can reduce additional development resources necessary to provide such a service.

DESCRIPTION OF DRAWINGS

FIG. 3 shows a protocol stack which may be applied to the IP-based next-generation hybrid broadcasting system according to an embodiment to which the present invention may be applied.

FIG. 8 shows response code for an application execution request message, which is an embodiment to which the present invention is applied.

FIGS. 9 to 13 show various methods for inserting application information into a message for a connection between the applications of devices, which are embodiments to which the present invention is applied.

FIGS. 18 and 19 are embodiments to which the present invention is applied, wherein FIG. 18 shows basic architecture to which a multi-screen service is applied and FIG. 19 shows architecture to which an extended multi-screen service is applied.

FIGS. 27 to 43 illustrate actions for application management and arguments thereof, which are embodiments to which the present invention is applied.

FIG. 27 shows a first application information-obtaining action and arguments thereof, which is an embodiment to which the present invention is applied.

FIG. 28 shows a second application information-obtaining action and arguments thereof, which is an embodiment to which the present invention is applied.

FIG. 29 shows an available application information-obtaining action and arguments thereof, which is an embodiment to which the present invention is applied.

FIG. 30 shows a running application information-obtaining action and an argument thereof, which is an embodiment to which the present invention is applied.

FIG. 31 shows a running status information-obtaining action and arguments thereof, which is an embodiment to which the present invention is applied.

FIG. 32 shows a first application activation action and arguments thereof, which is an embodiment to which the present invention is applied.

FIG. 33 shows a second application activation action and arguments thereof, which is an embodiment to which the present invention is applied.

FIG. 34 shows a deactivation action and arguments thereof, which is an embodiment to which the present invention is applied.

FIG. 35 shows a first application installation action and arguments thereof, which is an embodiment to which the present invention is applied.

FIG. 36 shows a second application installation action and arguments thereof, which is an embodiment to which the present invention is applied.

FIG. 37 shows an uninstallation action and arguments thereof, which is an embodiment to which the present invention is applied.

FIG. 38 shows an installation status information-obtaining action and arguments thereof, which is an embodiment to which the present invention is applied.

FIG. 39 shows a connection information-obtaining action and arguments thereof, which is an embodiment to which the present invention is applied.

FIG. 40 shows an apptoapp connection (i.e., connection between applications) action and arguments thereof, which is an embodiment to which the present invention is applied.

FIG. 41 shows an apptoapp disconnection (i.e., disconnection between applications) action and arguments thereof, which is an embodiment to which the present invention is applied.

FIG. 42 shows a current connection information-obtaining action and arguments thereof, which is an embodiment to which the present invention is applied.

FIG. 43 shows a searchable field-obtaining action and an argument thereof, which is an embodiment to which the present invention is applied.

FIG. 44 shows state variables for application management, which is an embodiment to which the present invention is applied.

MODE FOR INVENTION

Figure 1:
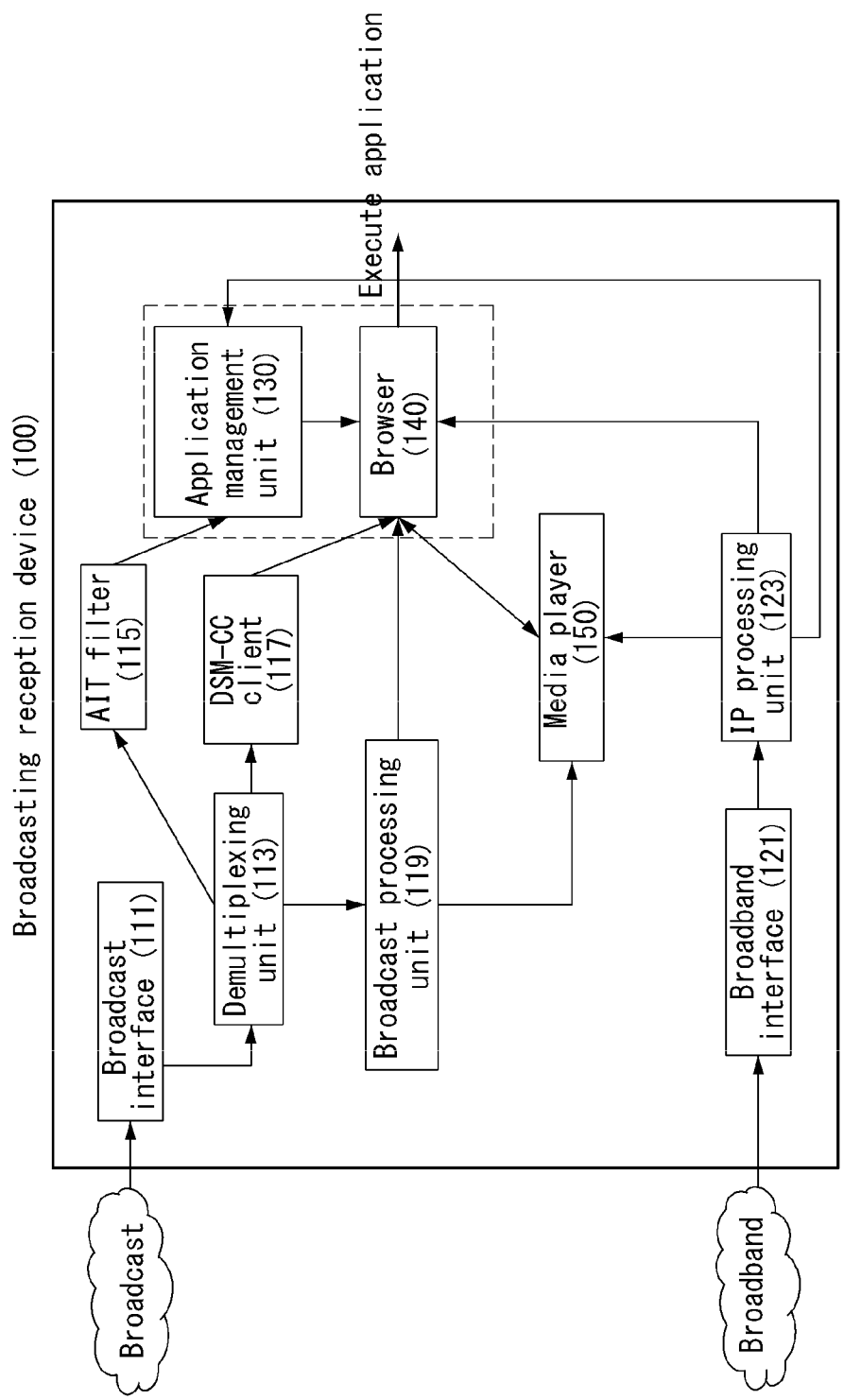
FIG. 1 shows the configuration of a broadcasting reception device of an IP-based next-generation hybrid broadcasting system according to an embodiment to which the present invention may be applied.

In an embodiment of the present invention, upon Device to Device (D2D) communication, it may be presented that messages, commands, calls, actions, or requests/responses are exchanged.

In an embodiment of the present invention, in order to deliver a message used upon D2D communication to a required target device, various protocols, such as an Internet Control Message Protocol (ICMP) and an Internet Group Management Protocol (IGMP), in addition to an Internet Protocol (IP) may be used, and the present invention is not limited and applied to a specific protocol.

In an embodiment of the present invention, in order to stably deliver a message used upon D2D communication, control a message flow, solve a collision or congestion between a plurality of messages, and support multiplexing, various protocols, such as a Datagram Congestion Control Protocol (DCCP) and a Stream Control Transmission Protocol (SCTP), in addition to a Transmission Control Protocol (TCP) and a User Datagram Protocol (UDP) may be used, and the present invention is not limited and applied to a specific protocol.

In an embodiment of the present invention, in order to contain a message used upon D2D communication in a variety of pieces of information and deliver it for various purposes, various protocols, such as a Hypertext Transfer Protocol (HTT), a Real-time Transport Protocol (RTP), an Extensible Messaging and Presence Protocol (XMPP), and a File Transfer Protocol (FTP), may be used, and the present invention is not limited and applied to a specific protocol.

In an embodiment of the present invention, when a message used upon D2D communication is delivered through the various protocols, required message data may be contained in various message components, such as the message header and message body of message components defined in each protocol, and delivered, and the present invention is not limited to a specific message component.

In an embodiment of the present invention, when a message used upon D2D communication is delivered through the various protocols, data to be delivered may be delivered in various forms (e.g., a string, an integer, a floating point, Boolean, a character, an array, and a list) defined in each protocol. In order to represent, deliver, and store the data of complicated contents more structurally, a markup method, such as an Extensible Markup Language (XML), a Hypertext Markup Language (HTML), an Extensible Hypertext Markup Language (XHTML), or a JavaScript Object Notation (JSON), text, or an image format may be used, and the present invention is not limited to a specific method.

In an embodiment of the present invention, data included in a message used upon D2D communication may be delivered using various data compression technologies, such as "gzip" (RFC 1952), "deflate" (RFC 1950), and "compress" (RFC 2616), and the present invention is not limited to a specific method.

A UPnP method, that is, one of D2D communication methods applied to embodiments of the present invention, is a D2D communication protocol that belongs to the various technologies and that is a combination of the IP-TCP/UDP-HTTP protocols.

All of UPnP actions proposed according to an embodiment of the present invention may be applied through a combination of various forms of the various layer technologies. All of contents proposed according to an embodiment of the present invention are not limited to a UPnP method. That is, in this specification, a UPnP method is basically described as an embodiment for forming a network, but the present invention is not limited thereto and may be applied to the technologies of the aforementioned methods.

FIG. 1 shows the configuration of a broadcasting reception device of an IP-based next-generation hybrid broadcasting system according to an embodiment to which the present invention may be applied.

In the IP-based next-generation hybrid broadcasting system to which an embodiment of the present invention may be applied, a broadcasting reception device 100 may have been connected to a broadcast network and a broadband network. In this specification, the broadcasting reception device 100 may mean a DVB terminal, a hybrid terminal, a hybrid DVB terminal, or a non-hybrid DVB terminal. Furthermore, the broadcasting reception device 100 may mean a web-based hybrid broadcast broadband terminal and may download and execute an application.

Furthermore, in this specification, an application may have two types: a broadcast-independent application and a broadcast-related application.

The broadcast-independent application may be downloaded through a broadband and may access related data. For example, the broadcast-independent application may be an application that does not requires broadcast resources, and may be game, for example.

Furthermore, the broadcast-related application may be automatically executed or may be executed in response to a user request. The broadcast-related application may be downloaded through a broadband or broadcast and may access related data using any method. For example, the broadcast-related application may include an electronic program guide, a teletext service, etc.

The broadcasting reception device 100 may be connected to two networks in parallel. One of the two networks may be a broadcast DVB network, and the other thereof may be a broadband network. The broadcast DVB network may include DVB-T, DVB-S, DVB-C, etc.

The broadcasting reception device 100 may receive common broadcast A/V content, non-real-time A/V content, application data, application signaling information, etc. through a broadcast network connection.

The broadcasting reception device 100 may perform interactive communication with an application provider through a broadband network connection. Furthermore, the broadcasting reception device 100 may receive application data and non-linear A/V content through a broadband interface, and may support the non-real-time download of A/V content. Furthermore, the broadband interface may be connected a companion device in the same network.

Referring to FIG. 1, the broadcasting reception device 100 of the IP-based next-generation hybrid broadcasting system to which an embodiment of the present invention may be applied may include a broadcast interface 111, a demultiplexing unit 113, an Application Information Table (AIT) filter 115, a Digital Storage Media-Command and Control (DSM-CC) client 117, a broadcast processing unit 119, a broadband interface 121, an Internet Protocol (IP) processing unit 123, an application management unit 130, a browser 140, and a media player 150.

The broadcasting reception device 100 may receive AIT data, linear Audio-Visual (A/V) content, non-real-time A/V content, application data, and a stream event through the broadcast interface 111. In this case, the application data and the stream event may be transmitted using a DSM-CC object carousel. Furthermore, the non-real-time A/V content may be received by a file download protocol decoder (not shown).

Accordingly, the Digital Storage Media-Command and Control (DSM-CC) client 117 may recover data (e.g., application data and a stream event) from the object carousel and may provide the recovered data to a runtime environment unit. In this case, the runtime environment unit may mean an abstraction element in which an interactive application is present and executed. For example, the runtime environment unit may include the application management unit 130 and the browser 140.

The demultiplexing unit 113 may demultiplex a received signal to each unit. For example, the demultiplexing unit 113 may transmit Application Information Table (AIT) data to the AIT filter 115, may transmit linear audio-visual content to the broadcast processing unit 119, and may transmit application data and a stream event to the Digital Storage Media-Command and Control (DSM-CC) client 117.

The broadcast processing unit 119 may process linear audio-visual content, received from the demultiplexing unit 113, using the same method as that in a standard non-hybrid DVB terminal. The broadcast processing unit 119 may include all of DVB functions provided by a common non-hybrid DVB terminal.

Other data output by the broadcast processing unit 119 may be processed by the runtime environment unit. For example, such other data may include channel list information, Event Information Table present/following (EIT p/f), and functions for tuning.

Linear A/V content output by the broadcast processing unit 119 may be embedded in a user interface provided by an application, and such a function may be provided by the media player 150.

The application management unit 130 may take into consideration an Application Information Table (AIT) in order to control the life cycle an interactive application.

The browser 140 may present and execute an interactive application.

The broadcasting reception device 100 may be connected to the Internet through the broadband interface 121. The connection provides two methods for requesting application data from the server of an application provider.

The Internet Protocol (IP) processing unit 123 may include all of functions for processing data received from the Internet. A/V content output by the IP processing unit 123 may be transmitted to the media player 150 and embedded in a user interface provided by an application. Content transmitted through the broadband interface 121 and content transmitted through the broadcast interface 111 may be synchronized by a synchronization unit (not shown).

Furthermore, a companion screen interface (not shown) may enable the broadcasting reception device 100 to discover a companion device.

Interactive applications that are running in the browser 140 may request an application to be executed or installed in the companion device. Furthermore, an application being executed in the companion device may request the browser 140 to execute an interactive application.

A websocket server may enable communication between the application of the broadcasting reception device 100 and the application of the companion device (or another broadcasting reception device).

An IP-based next-generation hybrid broadcast system to which the present invention is applied includes a Hybrid Broadcast Broadband TV (HbbTV) system. In this case, the broadcast reception device 100 may mean a HbbTV terminal. Furthermore, the broadcast reception device 100 may include a companion device management unit (not shown) for managing a companion device. The companion device management unit may operate as a separate unit within the broadcast reception device 100. Alternatively, the companion device management unit may correspond to or may be included in the application management unit 130.

In an embodiment to which the present invention is applied, an application of the companion device may be launched in response to a request from the broadcast reception device 100. In this case, the companion device management unit of the broadcast reception device 100 may discover the companion device and may transmit application installation information or launch information to the companion device. The companion device may install or launch the application based on the application installation information or the launch information.

In another embodiment to which the present invention is applied, the application of the broadcast reception device 100 may be remotely launched by the companion device. In this case, the broadcast reception device 100 may receive discovery request information from the companion device or may receive an application launch request information. After receiving the discovery request information or the application launch request information, the companion device management unit of the broadcast reception device 100 may transmit application location information about the broadcast reception device 100 or may launch the application in response to the discovery request information or the application launch request information.

In another embodiment to which the present invention is applied, the application of the broadcast reception device 100 may directly communicate with an application of the companion device. In this case, the companion device management unit of the broadcast reception device 100 may provide information about service end points for the communication between the applications. For example, the broadcast reception device 100 may discover the location of the service end points through an Application Program Interface (API). Meanwhile, when the application of the companion device is launched by the broadcast reception device 100, the application of the companion device may check the location of the service end points based on parameters transmitted by the broadcast reception device 100. In contrast, when the application of the companion device is independently started, the location of the service end points needs to be discovered.

The broadcast reception device and the companion device may perform an interaction through the aforementioned methods.

Figure 2:
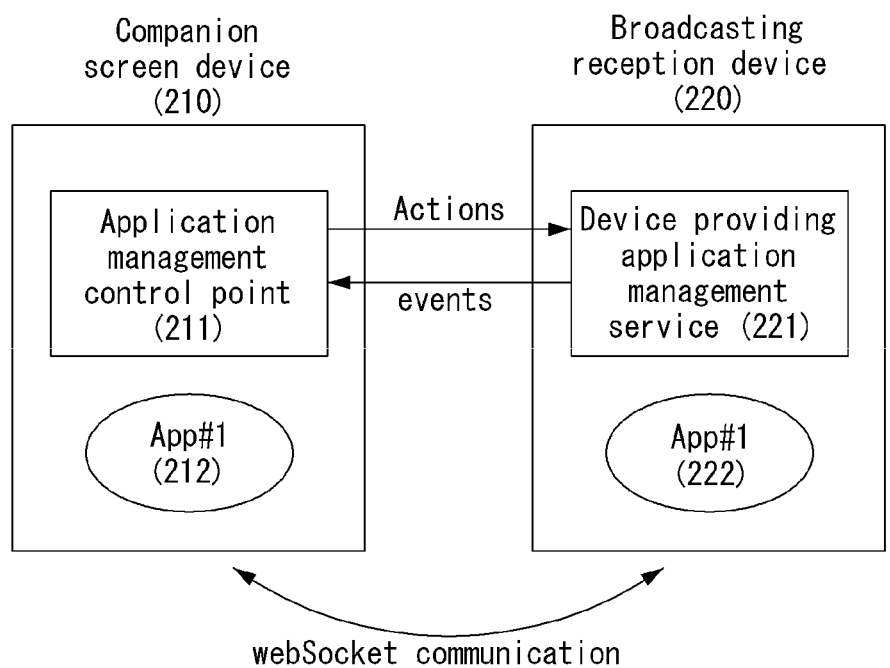
FIG. 2 shows basic architecture for illustrating a process for performing websocket communication between a companion device and a broadcasting reception device according to an embodiment to which the present invention may be applied.

FIG. 2 shows basic architecture for illustrating a process for performing websocket communication between a companion device and a broadcasting reception device according to an embodiment to which the present invention may be applied.

In an embodiment of the present invention, a personal smart device, such as a tablet or a smart phone, enables a broadcasting service to be used. The broadcasting service may require communication between applications installed on a broadcasting reception device and a personal device.

In order to provide an application or service, a network address at which communication is to be performed needs to be aware. However, it is inconvenient for a user to be always aware of a network address or to directly input the network address.

Accordingly, an embodiment of the present invention provides a method for establishing communication between a broadcasting reception device and a companion device even without information about the allocation of a network address.

An interface between the broadcasting reception device and the companion device may include an interface for metadata exchange, including content identification (CSS-CII), an interface for Wall Clock synchronization (CSS-WC), an interface for Timeline Synchronization (CSS-TS), and an interface for notification of Trigger Events (CSS-TE).

It is assumed that various devices are connected to a network providing a multi-screen service or an interactive service. The devices connected over the network may be categorized into a main screen device and a companion screen device depending on the role of a specific application and/or a method of using the specific application.

First, the main screen device is indicative of a device controlled by a companion screen device. For example, the main screen device may include a lean-back display device, such as TV or a set-top box. Furthermore, any display device may become a main screen device depending on a use scenario. For example, a device, such as a smart phone or a tablet, may become a main screen device.

The companion screen device is indicative of a device controlling the main screen device. For example, the companion screen device may include a lean-forward display device or a handheld display device, such as a smart phone or a tablet. Furthermore, any display device may become a companion screen device depending on a use scenario. For example, a device, such as TV or a set-top box, may become a companion screen device.

A screen device may mean a component which is performed along with a screen control point and which is used to provide various interactive services to another display device. The screen device may be designed to be controlled by the screen control point and to operate in conjunction with the screen control point. In order to support a multi-screen service, it is recommenced that a screen device operates as a main screen device (e.g., a lean-back display device, such as TV or a set-top box) controlled by a companion screen device. Furthermore, in order to support an extended multi-screen service, it is recommenced that a screen device operates as a companion screen device (e.g., a lean-forward display device or handheld display device, such as a smart phone or a tablet) that controls a main screen device.

A screen control point is indicative of a component which is performed along with a screen device and which is used to provide various interactive services to another display device. The screen control point may be designed to control the screen device in response to a user input and to operate in conjunction with the screen device. In order to support a multi-screen service, it is recommended that a screen control point operates as a companion screen device (e.g., a lean-forward display device or handheld display device, such as a smart phone or a tablet) that controls a main screen device. Furthermore, in order to support an extended multi-screen service, it is recommended that a screen control point operates as a main screen device (e.g., a lean-back display device, such as TV or a set-top box) controlled by a companion screen device.

A screen device, a companion device, a companion screen device, a main device, a physical device, a control device, a screen control point, a control point, etc. which are used in this specification, should not be construed as being limited to the meanings of the terms themselves and may be flexibly interpreted depending on the contents of a corresponding embodiment.

FIG. 2 shows a structure for providing an interactive service based on two of a variety of types of devices connected over a network, for example, a companion device 210 and a broadcasting reception device 220. In this case, the companion device 210 may operate as a screen control point, that is, an application management control point 211. The broadcasting reception device 220 may operate as a screen device, that is, a device providing an application management service 221.

The companion device 210 may transmit a request message to the broadcasting reception device 220. In response to the request message, the broadcasting reception device 220 may transmit an event message to the companion device 210.

The application management service 221 may determine that which application is supported and determine that which application is now running. Furthermore, the application management service 221 may retrieve detailed information about an application. The detailed information may include information indicative that what kind of a protocol between applications is supported by each application. Furthermore, the application management service 221 may retrieve information required to establish communication for a protocol between applications.

The application management control point 211 may enable the companion device 210 to discover a broadcasting reception device. In this case, the broadcasting reception device may operate as an UPnP device providing the application management service 221.

The application management service 221 may list DVB CSS-CII applications. In this case, the DVB CSS-CII application may be identified by matching protocol name information. Furthermore, a network interface (e.g., a CSS-CII interface) may be discovered by searching for an application having matching protocol name information within an application management service. In this case, the network interface may be a websocket base. Furthermore, another CSS interface may use another transmission mechanism other than a websocket.

FIG. 3 shows a protocol stack which may be applied to the IP-based next-generation hybrid broadcasting system according to an embodiment to which the present invention may be applied.

A broadcasting service according to an embodiment of the present invention may provide additional services, such as an HTML5 application, an interactive service, an ACR service, a second screen service, and a personalization service, in addition to audio/video (A/V) data. Such broadcasting services may be transmitted through a physical layer, that is, a broadcasting signal, such as terrestrial waves or cable satellites. Furthermore, a broadcasting service according to an embodiment of the present invention may be transmitted through an Internet communication network (broadband).

FIG. 3 shows elements forming UPnP device architecture. The UPnP device architecture may describe that how a control point discovers an UPnP device over a network. In this case, the control point may be unaware of the IP address of a device using a Simple Service Discovery Protocol (SSDP) 303 generated through an UDP 301. Furthermore, the UPnP device architecture may describe that a discovered UPnP device performs which capability. This may be performed by downloading XML device description document and XML service control protocol description document according to an HTTP 305.

Furthermore, the UPnP device architecture may describe that how a control point exchanges functions by retrieving an action using an SOAP 306 request message through the HTTP 305.

The UPnP device architecture may describe that how a control point receives an event using GENA 304 through a TCP 302.

Domain-specified functions may be described in each domain within a DCP 308. The DCP 308 may be materialized as an UPnP service within an UPnP device.

Figure 4:
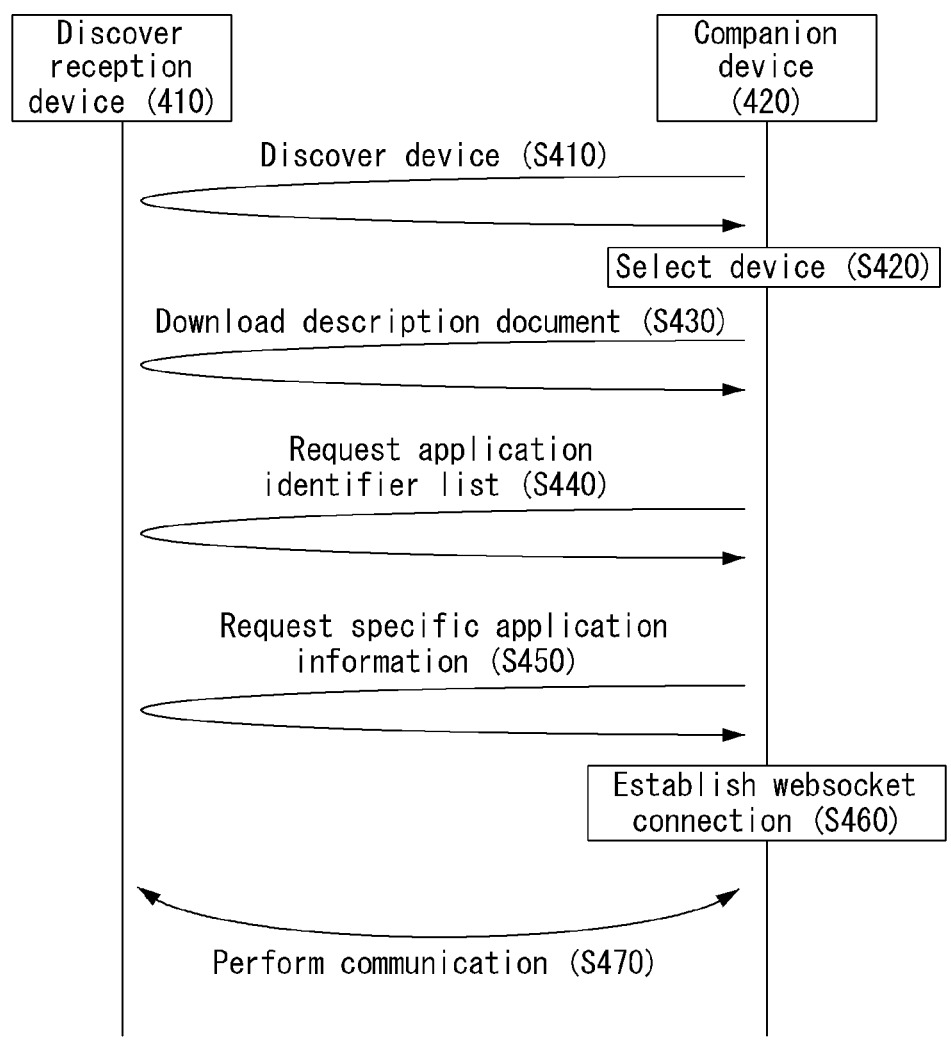
FIG. 4 is a flowchart illustrating a process for performing websocket communication between a companion device and a broadcasting reception device according to an embodiment to which the present invention may be applied.

FIG. 4 is a flowchart illustrating a process for performing websocket communication between a companion device and a broadcasting reception device according to an embodiment to which the present invention may be applied.

A companion device 420 may discover a device connected to a network (S410). In this case, a discovery action may be used. A broadcasting reception device 410 connected to the network may transmit a the response message to the companion device 420 in response to the discovery action. In this case, the companion device 420 may receive response messages from other devices connected to the network in addition to the broadcasting reception device 410.

The companion device 420 may select the broadcasting reception device 410 by filtering the received response messages (S420).

The companion device 420 may download description document from the selected broadcasting reception device 410 (S430). In this case, the description document may include device information about the broadcasting reception device 410. Furthermore, the companion device 420 may exchange service control protocol description information with the broadcasting reception device 410.

The companion device 420 may transmit a first request message for obtaining an application identifier list to the broadcasting reception device 410 (S440). For example, the first request message may be presented as a GetAppIDList( ) action, and may include discovery information and discovery field information.

The companion device 420 may determine whether an application matched with the discovery information is present by transmitting the first request message.

In response to the first request message, the broadcasting reception device 410 may transmit an application identifier to the companion device 420. In this case, the application identifier may identify a specific application matched with the discovery information.

For example, if the discovery field information is indicative of a matching protocol name and the discovery information is indicative of a specific protocol name (e.g., CSS-CII.TVDevice.CSS.DVB.org_ v1), the application identifier may identify an application matched with the specific protocol name.

When the companion device 420 obtains the application identifier, it may transmit a second request message for obtaining specific application information to the broadcasting reception device 410 (S450). For example, the second request message may be presented as a GetAppInfoByID( ) action, and may include the application identifier. The specific application information may be indicative of information about an application identified by the application identifier. The specific application information may include at least one of a websocket address and execution status information.

In response to the second request message, the broadcasting reception device 410 may transmit the specific application information to the companion device 420. The transmitted specific application information may be document of an XML form, and may include application information about the broadcasting reception device 410. In this case, another embodiment described in this specification may be applied to the application information.

The companion device 420 may establish a websocket connection based on the specific application information (S460).

The companion device 420 and the broadcasting reception device 410 may perform communication based on the established websocket connection (S470).

Figure 5:
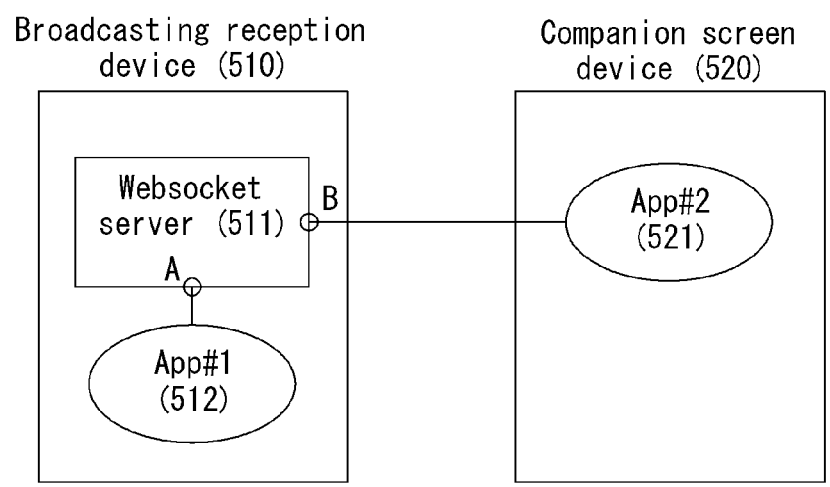
FIG. 5 shows architecture for illustrating a process for connecting a companion device and a broadcasting reception device through a websocket server according to an embodiment to which the present invention may be applied.

FIG. 5 shows architecture for illustrating a process for connecting a companion device and a broadcasting reception device through a websocket server according to an embodiment to which the present invention may be applied.

FIG. 5 shows a broadcasting reception device 510 and a companion device 520. The broadcasting reception device 510 may include an application processor and a network processor. The network processor may connect the application App #1 512 of the broadcasting reception device 510 and the application App #1 521 of the companion device 520. In this case, the network processor may be indicative of a websocket server 511, and the application processor may be indicative of the application App #1 512 or the application App #1 521.

If a newly generated stream head is associated with the same host header field value and the same URI request (Request-URI) as a stream head that now waits for a connection within a set of stream heads, the websocket server 511 may remove a matched stream head from the set and establish an interactive communication channel between two stream heads.

When the two stream heads are connected, a server immediately output all of data received from one of the two stream heads, and may not change to different stream heads. In this case, a transparent communications channel between two clients may be established.

When one of the two clients transmits a close frame, the server may transmit a corresponding close frame to the other of the two clients. If one of the two clients releases the connection without transmitting a close frame, the server may generate a close frame and transmit it to the other client.

That is, when there is a connection request from an application processor, the server may generate the stream head of the application processor and include the generated stream head in a stream head group. For example, referring to FIG. 5, when a connection request is received from the companion device 520, the websocket server 511 may generate the stream head of the companion device 520 and discover whether a matched stream head is present. If a matched stream head is found to be present, the websocket server 511 may connect the matched stream head of the application App #1 512 within the stream head group and the stream head of the application App #1 521 of the companion device 520. In this case, the websocket server 511 may remove the matched stream head of the application App #1 512 or the stream head of the application App #1 521 of the companion device 520 from the stream head group.

Figure 6:
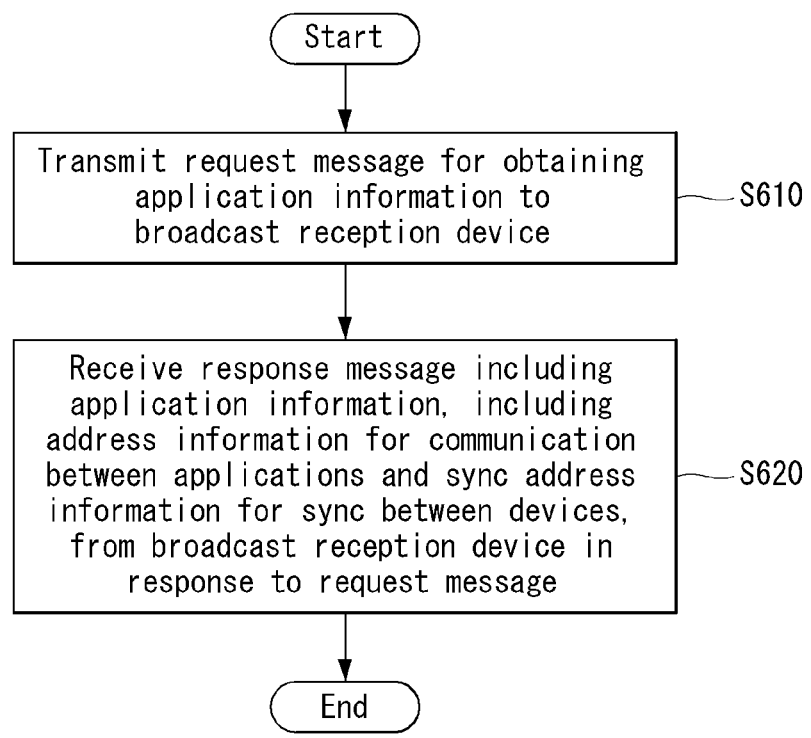
FIG. 6 is a flowchart illustrating a process for an application connection between a companion device and a broadcasting reception device according to an embodiment to which the present invention may be applied.

FIG. 6 is a flowchart illustrating a process for an application connection between a companion device and a broadcasting reception device according to an embodiment to which the present invention may be applied.

The present embodiment may be performed if the companion device performs control so that the application of the broadcast reception device is launched or if the application of the companion device is launched regardless of the application of the broadcast reception device.

Such a method may be performed through communication with an application that is being executed on the broadcast reception device or by another device that requires content synchronization.

For example, if the companion device and the broadcast reception device are connected over a network, the companion device may transmit a request message for obtaining application information to the broadcast reception device (S610).

In response to the request message, the companion device may receive a response message, including the application information, from the broadcast reception device (S620).

In this case, the application information may include address information for communication between applications and sync address information for sync between the devices. For example, the address information for communication between the applications may indicate a websocket server URL, and the sync address information may indicate an URL used for sync between the devices.

The response message may include information of an XML type. The information of an XML type may include essential elements and attribute information, and may further include an additional element. In this case, the additional element may include at least one of address information for the communication between the applications and sync address information for the sync between for the devices.

Figure 7:
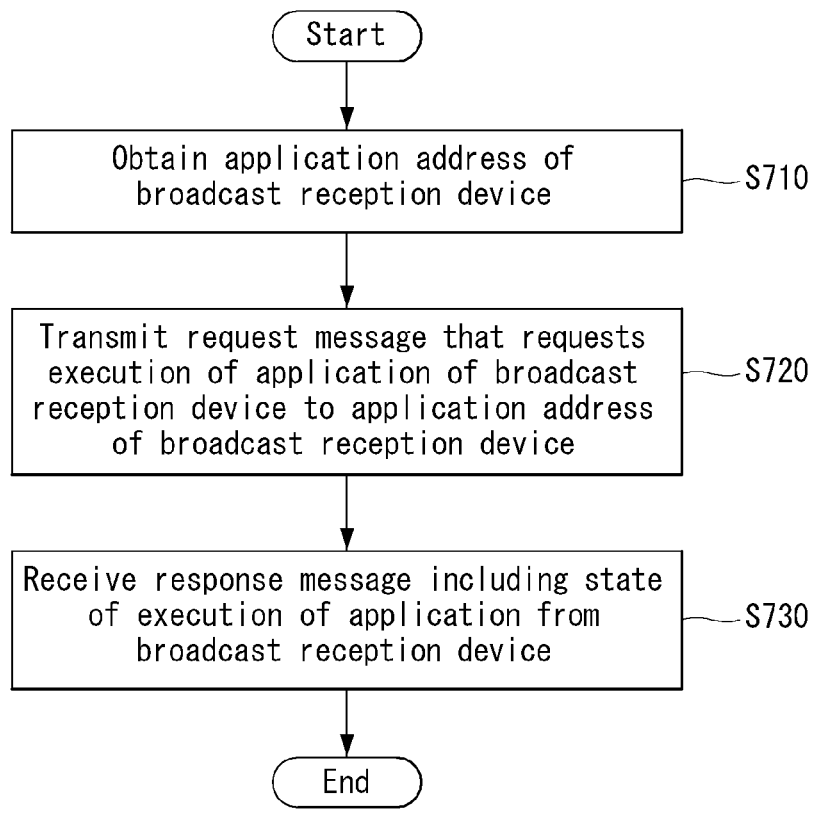
FIG. 7 shows a flowchart for illustrating a process for executing, by the companion device, an application of the broadcast reception device, which is an embodiment to which the present invention is applied.

FIG. 7 shows a flowchart for illustrating a process for executing, by the companion device, an application of the broadcast reception device, which is an embodiment to which the present invention is applied.

A connection through the applications of devices may be launched by a request from any one of the devices.

For example, a companion device may request the launch of the application of the other device through a specific protocol. In this case, the request may be performed by transmitting a request message to the application resource URL of the other device. The application resource URL may be obtained by a service search mechanism.

For a detailed example, when the companion device and the broadcast reception device are connected over a network, the companion device may obtain an application address of the broadcast reception device (S710). In this case, the application address of the broadcast reception device may be obtained by the service search mechanism.

The companion device may transmit a request message that requests the execution of the application of the broadcast reception device to the obtained application address of the broadcast reception device (S720).

In this case, the body data of the request message may include an application information table of an XML type. The application information table may include description information about the application of the broadcast reception device. For example, the application information table may include at least one of an application identifier and the type, control code, and version information of application description information.

The companion device may receive a response message from the broadcast reception device in response to the request message (S730). In this case, the response message may include code information indicative of the state of the execution of the application. A detailed description of the code information is given with reference to FIG. 8.

FIG. 8 shows response code for an application execution request message, which is an embodiment to which the present invention is applied.

A device that has received a request message that requests the execution of an application may transmit a response message including response code, such as that of FIG. 8.

For example, the response code may include response code indicating that the execution of an application is successful and response code indicating that the execution of the application has failed. Furthermore, the response code indicative of the failure may have different response code depending on a reason of a failure.

Referring to FIG. 8, response code "201 Running" is code indicating that an application has been successfully executed (S810). Response code "401 Unauthorized" is code indicating that an application is unable to be launched by a user (S820). Response code "403 Forbidden" is code indicating that an application is unable to be launched by a device (S830). Response code "500 Error" is code indicating that an application is unable to be launched due to the state of a device (S840).

FIGS. 9 to 13 show various methods for inserting application information into a message for a connection between the applications of devices, which are embodiments to which the present invention is applied.

FIG. 9 shows a method for inserting application information into the service list section of a message for a connection between the applications of devices.

First, a message for a connection between the applications of devices may include a device section S910 and a service list section. The service list section may include services S920 and S930 according to a service type.

For example, the service S920 may include information about an application management service. The service S930 may include information about a connection setup service.

In this case, the address information for communication between applications described in connection with the embodiment of FIG. 6 may be included in a connection setup service section. For example, as in S940, the address information may be inserted like "<ApptoAppConnectionAddress (or ApptoAppEndPoint)>URL for App-to-App Connection."

Furthermore, the sync address information for sync between devices may also be included in the connection setup service section. In this case, the sync address information may include at least one of address information for system synchronization and address information for content synchronization.

For example, referring to S950 and S960, insertion may be performed like "<SystemSyncEndPoint>URL for System Synchronization" and "<ContentSyncEndPoint>URL for Content Synchronization."

FIG. 10 shows a method for inserting application information into the device section of a message for a connection between the applications of devices.

The device section may include device type information and address information.

The device type information may indicate any one of a main device, a screen device, and a companion device S1010.

Furthermore, the address information for communication between applications described in the embodiment of FIG. 6 may be included in a device section. For example, as in S1020, the address information may be inserted like "<ApptoAppConnectionAddress (or ApptoAppEnd Point)>URL for App-to-App Connection."

Furthermore, sync address information for sync between devices may also be included in the device section. In this case, the sync address information may include at least one of address information for system synchronization and address information for content synchronization.

For example, referring to S1030 and S1040, insertion may be performed like "<SystemSyncEndPoint>URL for System Synchronization" and "<ContentSyncEndPoint>URL for Content Synchronization."

FIG. 11 shows a method for inserting application address information into the device section of an application message.

For example, the application address information may include at least one of address information for the launch of an application, address information for the pause of the application, and address information for the monitoring of the application.

At least one of the application address information may be included in the device section. Referring to S1110, for example, at least one of the application address information may be inserted like "<AppLaunchAddress>URL for Launching/Stopping/Monitoring</AppLaunchAddress>."

FIG. 12 shows a method for inserting application information into the service list section of an application message if the device type is Hybrid Broadcast Broadband TV (HbbTV).

For example, if the service type is "urn:hbbtv:service:HbbTVCompanionScreen:1", the address information for communication between applications described in connection with the embodiment of FIG. 6 may be included in the service section. For example, referring to S1210, the address information may be inserted like "<X_HbbTV_App2AppURL xmlns="urn:hbbtv:HbbTVCompanionScreen">URL of App2App communication service endpoint."

Furthermore, sync address information for sync between devices may also be included in the device section. In this case, the sync address information may include at least one of address information for media synchronization and address information for time synchronization.

For example, referring to S1220 and S1230, insertion may be performed like "<X_HbbTV_MediaSyncURL xmlns="urn:hbbtv:HbbTVCompanionScreen">URL of Media Synchronization communication service endpoint" and "<X_HbbTV_TimeSyncURL xmlns="urn:hbbtv:HbbTVCompanionScreen">URL of Time Synchronization communication service endpoint."

Furthermore, the address information for the launch of an application may also be inserted into the service section. For example, referring to S1240, the address information may be inserted like "<X_HbbTV_AppLaunchURLxmlns="urn:hbbtv:HbbTVCompanionScreen">URL of Application Launch service endpoint."

FIG. 13 shows a method for inserting application information into the device section of an application message if the device type is Hybrid Broadcast Broadband TV(HbbTV).

Referring to S1310, the application information may be inserted like "<X_HbbTV_App2AppURL xmlns="urn:hbbtv:HbbTVCompanionScreen">URL of App2App communication service endpoint." Referring to S1320 and S1330, insertion may be inserted like "<X_HbbTV_MediaSyncURL xmlns="urn:hbbtv:HbbTVCompanionScreen">URL of Media Synchronization communication service endpoint" and "<X_HbbTV_TimeSyncURL xmlns="urn:hbbtv:HbbTVCompanionScreen">URL of Time Synchronization communication service endpoint."

Furthermore, referring to S1340, address information for the launch of an application may also be inserted like "<X_HbbTV_AppLaunchURL xmlns="urn:hbbtv:HbbTVCompanionScreen">URL of Application Launch service endpoint."

In another embodiment to which the present invention is applied, a process for a connection between the applications of the companion device and the broadcast reception device is described.

The companion device may transmit a first request message for obtaining an application identifier list to the broadcast reception device. For example, the first request message may be represented as a GetAppIDList( ) action. The request message may include search information and search field information.

The companion device may determine whether an application matched with the search information is present by transmitting the first request message.

In response to the first request message, the companion device may receive the identifier of a specific application from the broadcast reception device. In this case, the identifier of the specific application may identify the specific application matched with the search information.

The companion device may obtain specific application information based on the identifier of the specific application. In this case, the specific application information may be obtained by transmitting a second request message for obtaining the specific application information. For example, the second request message may be represented as a GetAppinfoByID( ) action. The second request message may include the identifier of the specific application. The specific application information may indicate information about an application identified by an application identifier. The specific application information may include at least one of a websocket address and execution state information. Furthermore, the specific application information may be document of an XML format, and may include application information about the broadcast reception device. In this case, another embodiment described in this specification may be applied to the application information.

A connection between the applications of the companion device and the broadcast reception device may be performed based on the specific application information. In this case, the connection between the applications may be based on the websocket server.

In another embodiment to which the present invention is applied, a process for connecting the companion device and the broadcast reception device through the websocket server is described.

The companion device may determine whether an application matched with the name of a specific protocol is present. In this case, the determination may be performed by transmitting a request message for obtaining an application identifier list.

If an application matched with the name of the specific protocol is present, the companion device may obtain at least one of a websocket address and execution state information.

The companion device may establish a websocket connection based on at least one of the websocket address and the execution state information.

The companion device and the broadcast reception device may communicate with each other based on the established websocket connection.

Figure 14:
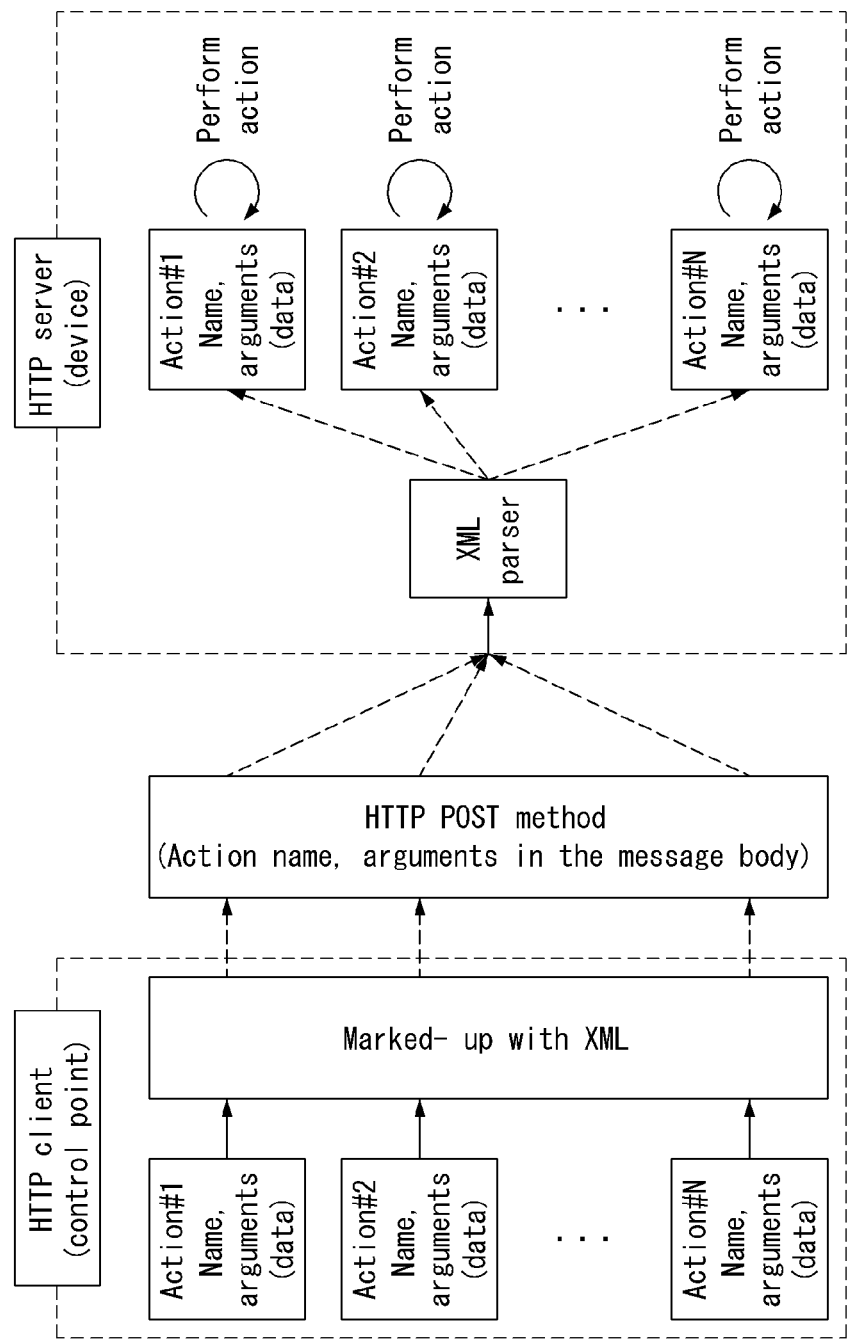
FIG. 14 is a block diagram illustrating a Universal Plug and Play (UPnP) mechanism, which is an embodiment to which the present invention is applied.

FIG. 14 is a block diagram illustrating a Universal Plug and Play (UPnP) mechanism according to an embodiment to which the present invention may be applied.

An UPnP action proposed according to an embodiment of the present invention is one of examples of various D2D communication methods, and is indicative of a control URL obtained in a UPnP discovery and description information transmission process. The UPnP action may deliver data to be actually delivered in an XML form through an HTTP POST message body using a POST method defined in HTTP. In the case of an UPnP protocol, an action name is defined in each action and used, and the action name is also delivered through an HTTP POST message body delivered in an XML form. Accordingly, unlimited types of actions (or messages) can be exchanged although there is only one URL for a target device and only one HTTP POST method is used.

Figure 15:
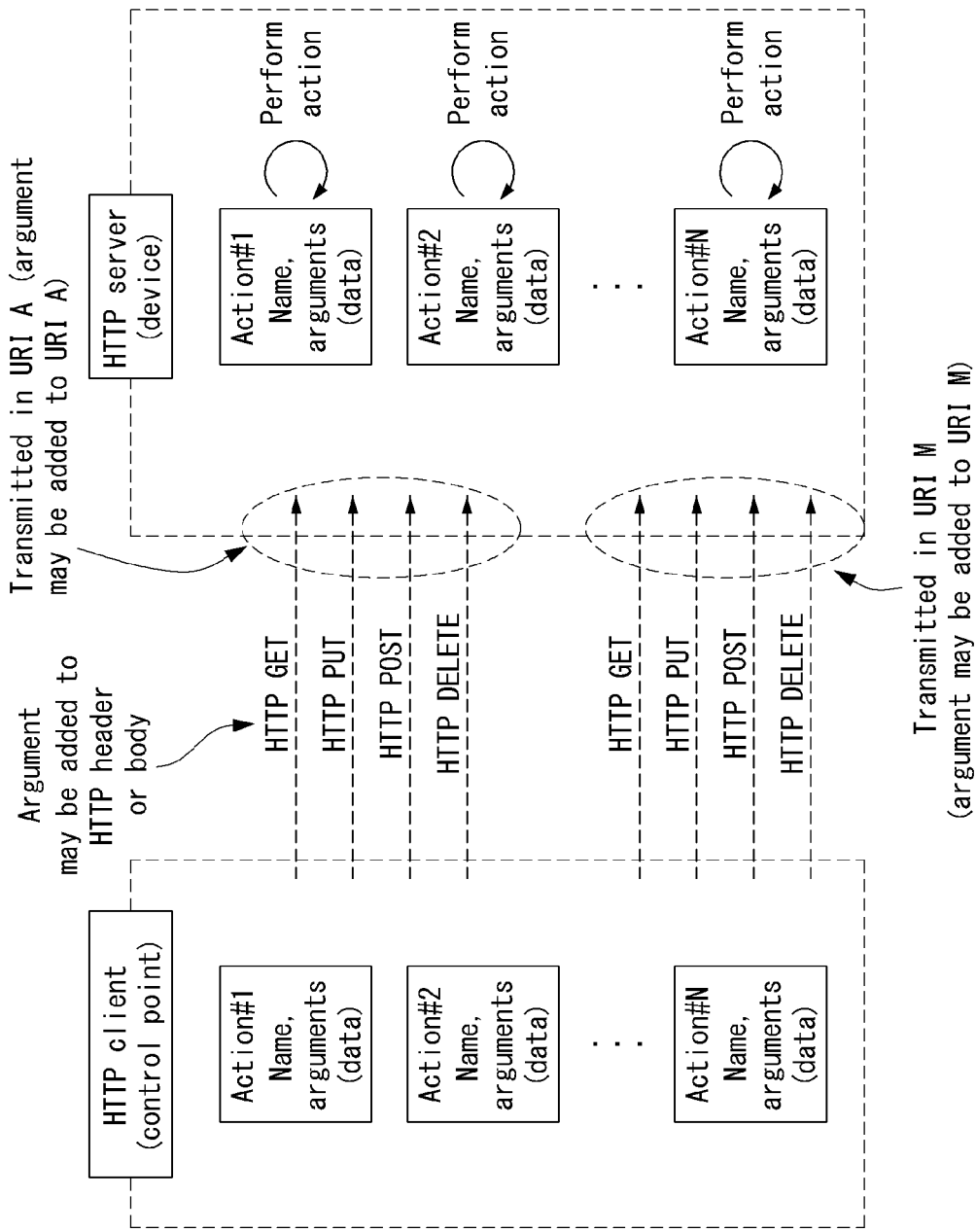
FIG. 15 is a block diagram illustrating a REpresentational State Transfer (REST) mechanism, which is an embodiment to which the present invention is applied.

FIG. 15 is a block diagram illustrating a REpresentational State Transfer (REST) mechanism according to an embodiment to which the present invention may be applied.

For example, D2D communication proposed according to an embodiment of the present invention may be applied even without defining an action name if several methods, such as GET, HEAD, PUT, DELETE, TRACE, OPTIONS, CONNECT, and PATCH, are used in addition to POST of HTTP methods and a plurality of URIs from which a target device will be accessed. Data to be delivered may be added to a corresponding URI and delivered or may be included in an HTTP body in various forms and delivered. However, a plurality of URI values for such an REST method may be obtained in a discovery and description information transmission process.

Figure 16:
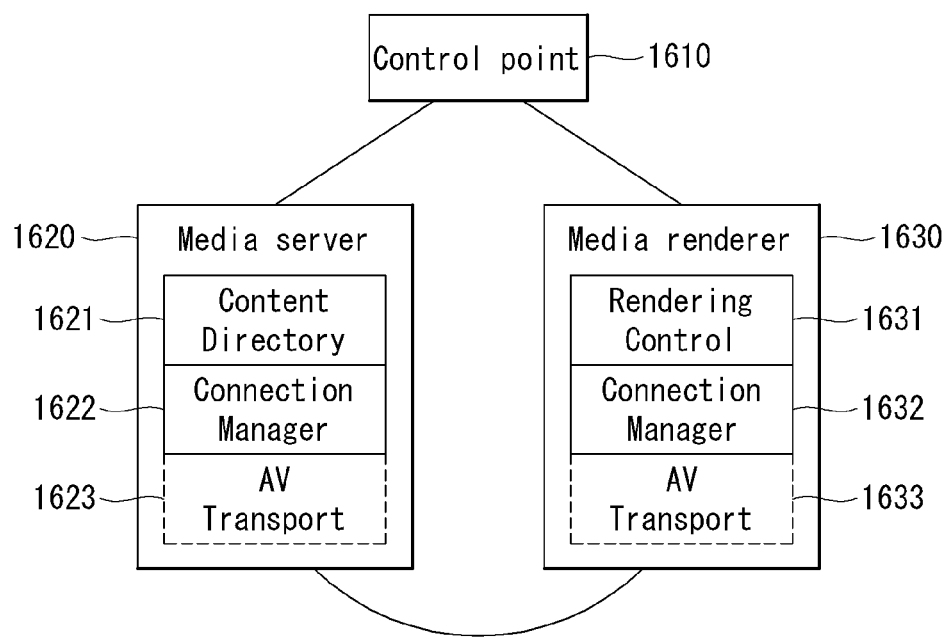
FIG. 16 shows a schematic configuration of a Universal Plug and Play (UPnP) Audio-Visual (AV) network, which is an embodiment to which the present invention is applied.

FIG. 16 shows a schematic configuration of a Universal Plug and Play (UPnP) Audio-Visual (AV) network according to an embodiment to which the present invention may be applied.

A Universal Plug and Play (hereinafter referred to as "UPnP") technology and a digital living network alliance (hereinafter referred to as "DLNA") technology enable services and control between home appliances of various manufacturers. In particular, the UPnP technology enables compatible Audio-Visual (AV) services and control between AV devices. The compatible AV services include media streaming, uploading, and downloading.

A UPnP-based network proposed for home networking basically includes a plurality of UPnP devices, services, and a Control Point (CP) logically. In a UPnP network, service means the smallest control unit in a network and is modeled through state variables.

In a UPnP-based network, a CP means a control application having a function for detecting and controlling other devices and/or services. The CP may be operated in a specific device, for example, a physical device, such as a mobile device that is easy to handle by a user.

A UPnP-based AV home network includes a Media Server (MS) for providing media data to the home network, a Media Renderer (MR) for playing back media data over the home network, and an AV Control Point (CP) for controlling the MS and the MR. The MS and the MR are controlled devices controlled by a CP.

The MS (more specifically, a Content Directory Service (CDS) within the MS) has previously constructed information about media files and containers (corresponding to directories) gathered therein in the form of each of pieces of object information. The "object" is a term collectively referring to an item having information about one or more media files, for example, pictures, moving images, or audio files and a container having information about a directory. The term "object" may be used as a term referring to an "item" or "container" according to circumstances.

Furthermore, a single item corresponds to one or a plurality of media files. For example, a plurality of media files having the same contents of content with different bit rates may be managed as a single item.

Information about an object is also called "metadata." A variety of types of information about associated content are written in the metadata. For example, an ID assigned to an object corresponding to content, identification information about a container to which the object belongs, a title, information about whether the object is an item or container, the type of media, and a protocol and access position information from which associated content (e.g., a media file) may be obtained are written in the metadata. Furthermore, such metadata is written in a mark-up language form and is stored in storage managed by a CDS regardless of storage in which an associated media file is stored. In this case, the metadata may be stored in a mobile recording medium and provided to the CDS. The metadata of content written as described above is provided according to an action fetched by a control point. Furthermore, part of or the entire metadata may be provided to an MR through the medium of the control point.

In an embodiment of the present invention, UPnP may categorize such devices into a Control Point (CP) device and a control target device. A Digital Media Controller (DMC) and a Digital Media Player (DMP) may be categorized as a CP device, and a Digital MR (DMR), a Digital Media Server (DMS), a Digital Media Printer (DMPr) may be categorized as a control target device.

Furthermore, when a CP device of UPnP or a DMP of DLNA or a DMC requests content metadata from a control target device of UPnP or a DMS of DLNA, the control target device or the DMS may collect a plurality of content metadata (i.e., a list of generated content) corresponding to stored content, respectively, and may transmit them to the CP device or the DMP.

DLNA may define a Digital Media Server (DMS), a Digital Media Player (DMP), a Digital Medial Renderer (DMR), a Digital Media Controller (DMC), and a Digital Media Printer (DMPr), that is, home network devices, and may define a Mobile Digital Media Server (M-DMS), a Mobile Digital Media Player (M-DMP), a Mobile Digital Media Uploader (M-DMU), a Mobile Digital Media Downloader (M-DMD), and a Mobile Digital Media Controller (M-DMC), that is, mobile portable devices. Hereinafter, the DMS may be used as a concept covering the M-DMS, the DMP may be used as a concept covering the M-DMP, and the DMC may be used as a concept covering the M-DMC.

Furthermore, DLNA may be defined by a 2 box model and a 3 box model. The 2 box model includes the DMP and the DMS. In the 2 box model, the DMP enables a user to search for content browsed and distributed by the DMS and to play back the retrieved content. The 3 box model includes the DMC, the DMS, and the DMR. In the 3 box model, the DMC enables a user to search for the content of the DMS to be played back by the DMR.

As shown in FIG. 16, the UPnP-based AV network may be configured to include a Media Server (MS) 1620 for providing media data to a network, a Media Renderer (MR) 1630 for playing back media data over a network, and a Control Point (CP) 1610 for controlling the MS 1620 and the MR 1630. The MS 1620 and the MR 1630 are controlled devices controlled by the CP 1610.

The MS 1620 may include a Content Directory Service (CDS) 1621, a connection manager service 1622, and an AV transport service 1623.

In order to notify the CP 1610 of directory information, the MS 1620 may notify the CP 1610 of information about a media file using its own file system whenever an UPnP action, for example, a browsing action is present. Furthermore, the data of a media file selected through the user interface of the CP 1610 may be transmitted using a streaming method between the MS 1620 and the MR 1630 and played back through the MR 1630.

In this case, any one of known various methods may be used as the streaming method. For example, an out-of-band transfer protocol may be used as the streaming method. For detailed example, if a Real-time Transport Protocol (RTP) is used for media transfer, the transfer status of media data may be monitored using a Real Time Control Protocol (RTCP), and a transfer parameter may be controlled based on the transfer state.

The CP 1610 may control the MS 1620 and the MR 1630 and may be performed by fetching an UPnP action provided based on a Standardized Simple Object Access Protocol (SOAP), for example. Furthermore, the CP 1610 may subscribe to an event service provided by a device and receive a report regarding a change in the status information of the device.

The MS 1620 may include the CDS service 1621 for providing a service that discovers media data managed by the CDS unit, the connection manager service 1622 for managing a connection with another device, that is, the MR 1630, and the AV transport service 1623 for enabling control of the playback of media, for example, control, such as play and stop.

The MR 1630 may include a rendering control service 1631 for enabling control of the brightness and luminosity of a screen when media is presented, a connection manager service 1632 for managing a connection with another device, and an AV transport service 1633.

The CP 1610 may check media file information within a server using the content directory service 1621 of the MS 1620. When a user selects a specific media file based on the media file information, the CP 1610 may set up a connection for media transport between the MS 1620 and the MR 1630 through the connection manager services 1622 and 1632 of respective devices. Furthermore, the CP 1610 may configure variables for control of the playback of a corresponding media file using the AV transport service 1623 or 1633, and may request a playback action from the MS (in the case of push mode) or the MR (in the case of pull mode) so that the media file is played back. During the playback, the CP 1610 may control the brightness or luminosity of a screen or the volume through the rendering control service 1631 of the MR 1630.

Furthermore, the CP 1610 may subscribe to an event provided by each service and monitor information about a change in the content of the MS 1620 or a change in the status of a current media stream.

Accordingly, a user may request media to be played back in a plurality of devices, that is, a plurality of renderers, through a home network, or may move to another place while watching media through a single renderer and continue to watch the media at the place through the renderer.

Figure 17:
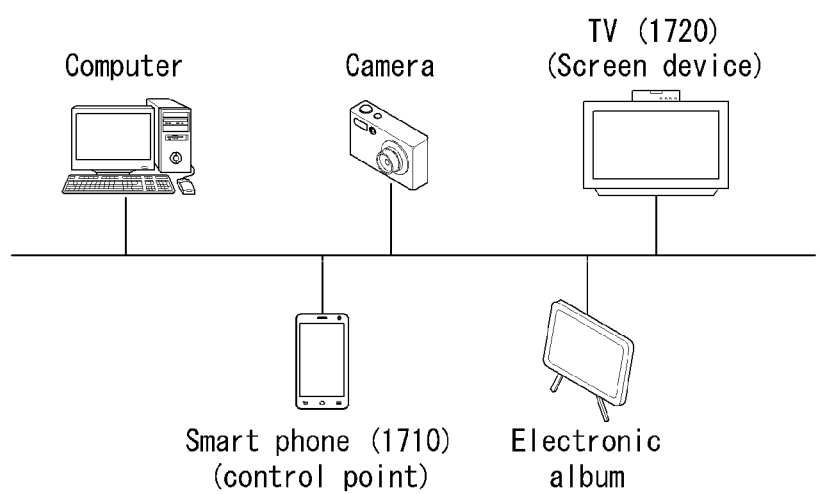
FIG. 17 shows an example of a Universal Plug and Play (UPnP) Audio-Visual (AV) network to which a multi-screen service is applied, which is an embodiment to which the present invention is applied.

FIG. 17 shows an example of a Universal Plug and Play (UPnP) Audio-Visual (AV) network to which a multi-screen service is applied according to an embodiment to which the present invention may be applied.

A network providing a multi-screen service to which an embodiment of the present invention is applied may be connected to various devices. For example, a multi-screen service may be provided if electronic devices capable of an interactive service, such as a computer, a camera, a printer, and an electronic album, in addition to a smart phone 1710 and TV 1720 are connected, as shown in FIG. 17.

In this case, the multi-screen service may mean a time-sensitive and interactive service provided between various display devices. For example, the multi-screen service may include an implementation-specific application.

Figure 18:
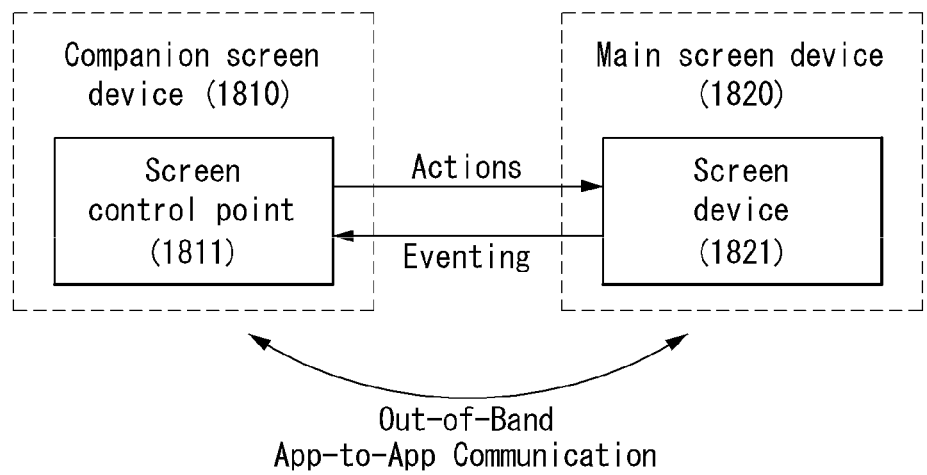
Figure 19:
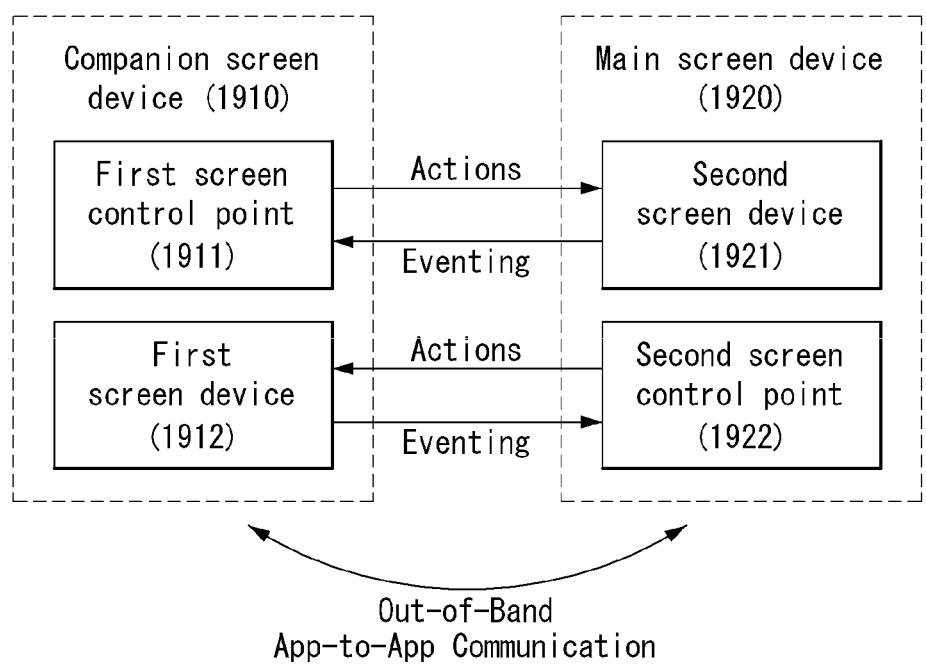

FIGS. 18 and 19 are embodiments to which the present invention may be applied. FIG. 18 shows basic architecture to which a multi-screen service is applied, and FIG. 19 shows architecture to which an extended multi-screen service is applied.

It is assumed that various devices are connected to a network providing a multi-screen service. The devices connected over the network may be categorized into a main screen device and a companion screen device depending on the role of a specific application and/or a method of using the specific application.

First, the main screen device is indicative of a device controlled by a companion screen device. For example, the main screen device may include a lean-back display device, such as TV or a set-top box. Furthermore, any display device may become a main screen device depending on a use scenario. For example, a device, such as a smart phone or a tablet, may become a main screen device.

The companion screen device is indicative of a device controlling the main screen device. For example, the companion screen device may include a lean-forward display device or a handheld display device, such as a smart phone or a tablet. Furthermore, any display device may become a companion screen device depending on a use scenario. For example, a device, such as TV or a set-top box, may become a companion screen device.

FIG. 18 shows architecture for providing an interactive service based on two of various devices connected over a network, for example, a companion screen device 1810 and a main screen device 1820. In this case, the companion screen device 1810 may operate a screen control point 1811, and the main screen device 1820 may operate as a screen device 1821. For example, referring to FIG. 18, the companion screen device 1810 may transmit actions for controlling the main screen device 1820. The main screen device 1820 may transmit an event message to the companion screen device 1810 or transmit a response message for the actions to the companion screen device 1810. In this case, the companion screen device 1810 operates as the screen control point 1811, and the main screen device 1820 operates as the screen device 1821.

Furthermore, an embodiment of the present invention can provide an extended multi-screen service. In this case, the extended multi-screen service may mean a service that requires more sophisticated interactions.

FIG. 19 shows architecture for providing an extended multi-screen service based on two devices connected over a network, for example, a companion screen device 1910 and a main screen device 1920.

For example, referring to FIG. 19, an operation between a first screen control point 1911 and a first screen device 1912 is the same as that described with reference to FIG. 18. Furthermore, the main screen device 1920 may transmit actions for controlling the companion screen device 1910. The companion screen device 1910 may transmit an event message to the main screen device 1920 or transmit a response message for the actions to the main screen device 1920. In this case, the main screen device 1920 operates as the second screen control point 1911, and the companion screen device 1910 operates as the second screen device 1912.

That is, the companion screen device 1910 may operate as the first screen control point 1911 and operate as the second screen device 1912 in accordance with the main screen device 1920. Furthermore, the main screen device 1920 may operate as a first screen device 1921 or operate as a second screen control point 1922 in accordance with the companion screen device 1910.

A screen device may mean a component which is performed along with a screen control point and which is used to provide various interactive services to another display device. The screen device may be designed to be controlled by the screen control point and to operate in conjunction with the screen control point.

In order to support a multi-screen service, it is recommenced that a screen device operates as a main screen device (e.g., a lean-back display device, such as TV or a set-top box) controlled by a companion screen device.

Furthermore, in order to support an extended multi-screen service, it is recommenced that a screen device operates as a companion screen device (e.g., a lean-forward display device or handheld display device, such as a smart phone or a tablet) that controls a main screen device.

Furthermore, a screen control point is indicative of a component which is performed along with a screen device and which is used to provide various interactive services to another display device. The screen control point may be designed to control the screen device in response to a user input and to operate in conjunction with the screen device.

In order to support a multi-screen service, it is recommended that a screen control point operates as a companion screen device (e.g., a lean-forward display device or handheld display device, such as a smart phone or a tablet) that controls a main screen device.

Furthermore, in order to support an extended multi-screen service, it is recommended that a screen control point operates as a main screen device (e.g., a lean-back display device, such as TV or a set-top box) controlled by a companion screen device.

For example, referring to FIG. 19, both the main screen device 1920 and the companion screen device 1910 may operate as screen devices and also operate as screen control points.

In order to interoperate a new type of service between devices connected over a network, an embodiment of the present invention provides a method and apparatus for providing an interactive service in an application form without a separate protocol. More specifically, there are provided a method and apparatus for managing an application in a network providing a multi-screen service.

For example, if a user wants to use an interactive service X through devices A and B connected over a network, an implementation may be possible so that the interactive service X is always running in the devices A and B. Alternatively, the user may conveniently use the interactive service X if a device notifies the user whether a specific application needs to be installed and/or executed without a need for the user to directly search for an application for the interactive service X in the devices A and B and to install or execute the application.

For another example, devices A and B may have or may not have the same application. If the devices A and B have the same application, the devices A and B may provide an interactive service through application execution. If the devices A and B do not have the same application, an interactive service may be provided by checking that a device requires what application and downloading and/or executing the application.

Furthermore, in an embodiment of the present invention, user convenience can be improved in such a manner that management, such as the installation, running, stopping running, and uninstallation, for an application of the other device is made possible through one device.

Furthermore, in an embodiment of the present invention, a message including an ID and a password may be transmitted so that only a permitted specific user or device may use the interactive service X.

Furthermore, an embodiment of the present invention provides a method for performing a connection between applications installed in a device. For example, if applications capable of an interaction have been installed in devices A and B, the two devices A and B may share information for an interaction, and the applications may directly communicate with each other by sharing the information.

Furthermore, one device, together with the other device, may form a plurality of connections. In this case, the other device may be one device or a plurality of devices. The device may support the plurality of connections at the same time and control the plurality of connections. Furthermore, information about a specific one of the plurality of connections or information about all the connections may be transmitted so that another device is aware of the information.

In an embodiment of the present invention, only a permitted specific user or specific device may be permitted to perform an embodiment described in this specification. To this end, an ID and a password may be included in a message, and the message may be transmitted.

In an embodiment of the present invention, a user may subscribe to an application management service so as to use an interactive service between devices connected over a network. Furthermore, a user's rights to use an application management service may be permitted or limited through a separate right setting process.

In an embodiment of the present invention, a synchronization process between devices may be required in order to use a time-sensitive interactive service between devices connected over a network. For example, a synchronization mechanism, such as basic clock synchronization and content synchronization, may be required.

In an embodiment of the present invention, a device supporting an application management service, a connection establishment service, and a synchronization service may be discovered in a network through a discovery mechanism. Furthermore, devices may exchange additional information about each service through a description mechanism.

Hereinafter, embodiments are described in detail with reference to the accompanying drawings. Redundant contents in various embodiments may be omitted, and a detailed description of terms used in this specification or embodiments may be applied to other embodiments.

Figure 20:
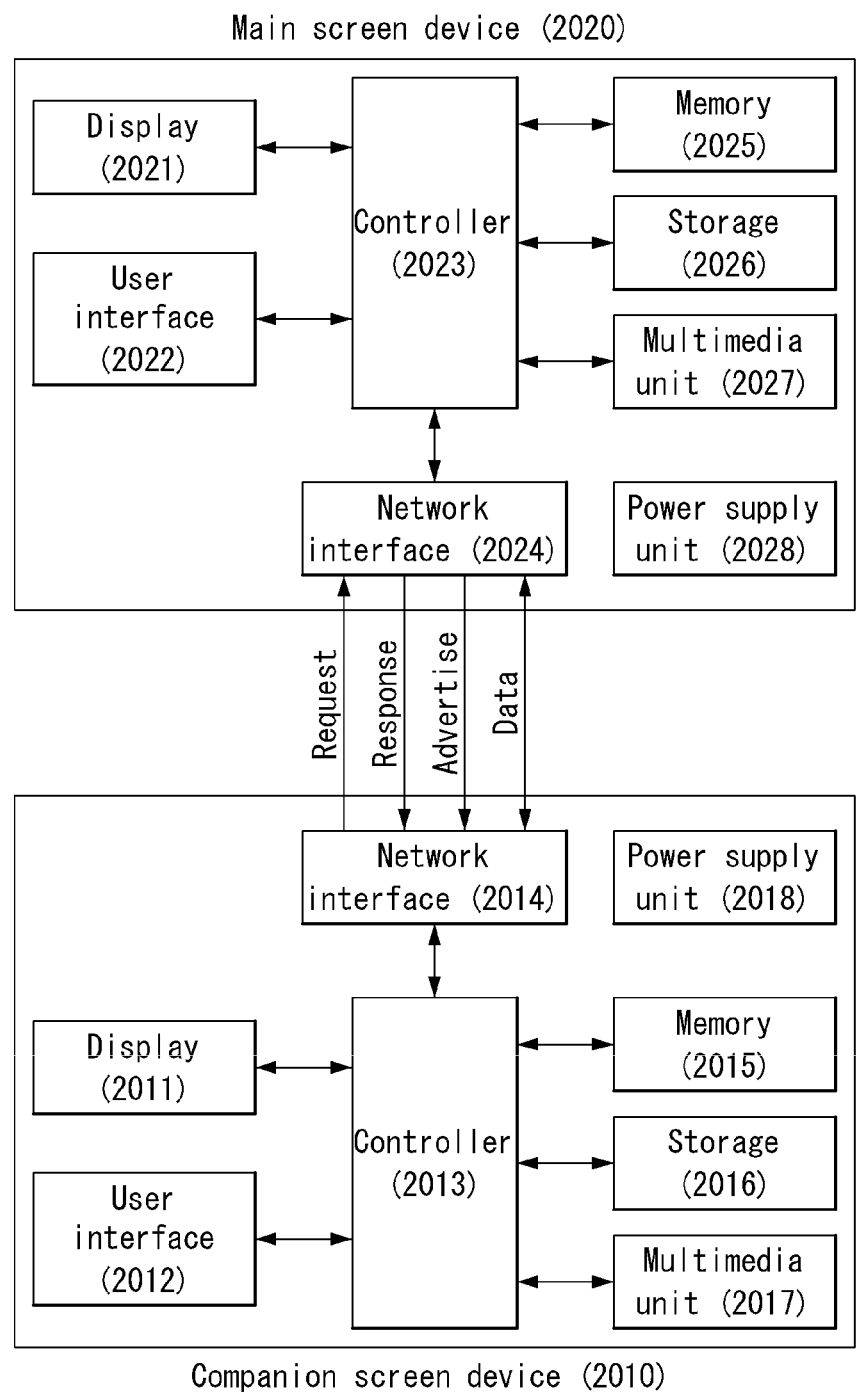
FIG. 20 shows a schematic configuration of a device to which a multi-screen service is applied, which is an embodiment to which the present invention is applied.

FIG. 20 shows a schematic configuration of a device to which a multi-screen service is applied according to an embodiment to which the present invention may be applied.

FIG. 20 is an internal block diagram of a companion screen device 2010 and a main screen device 2020 providing an extended multi-screen service.

The companion screen device 2010 may include a display 2011, a user interface 2012, a controller 2013, a network interface 2014, memory 2015, storage 2016, a multimedia unit 2017, and a power supply unit 2018.

The display 2011 displays data received through the network interface 2014 or data stored in the storage 2016 on a screen under the control of the controller 2013.

The user interface 2012 plays the role of a passage that provides information to a user by transmitting a signal from the user to the controller 2013 and outputting a signal controlled by the controller 2013 through the display 2011.

The controller 2013 functions to control an overall operation of the companion screen device 2010. Various embodiments described in this specification may be performed through the controller 2013.

The network interface 2014 may receive a message, including at least one of a command, a request, an action, a response, an event message, an advertising message, and data, from an external device or may transmit such a message to an external device. Furthermore, the network interface 2014 may be a physical component of the companion screen device 2010.

The memory 2015 is an optional device implemented in various types of devices and may temporarily store various types of data. For example, the memory 2015 may be a volatile type of a physical device.

The storage 2016 may store various types of information. For example, the storage 2016 may be a nonvolatile type of a physical device, such as an SD card. The storage 2016 may include a content storage unit (not shown), a metadata storage unit (not shown), and a buffer (not shown). The content storage unit (not shown) may store media content data. The metadata storage unit (not shown) may store metadata indicative of additional information about content. The metadata storage unit (not shown) may sort and store metadata. The buffer (not shown) may temporarily store various types of data.

The multimedia unit 2017 is a device for various types of multimedia playback, and may play back stored content or content received from the outside. The multimedia unit 2017 may be implemented in the controller 2013 or may be implemented separately from the controller 2013.

The power supply unit 2018 is supplied with external power or internal power, and it supplies power for the operations of the elements under the control of the controller 2013.

Furthermore, the main screen device 2020 may include a display 2021, a user interface 2022, a controller 2023, a network interface 2024, memory 2025, storage 2026, a multimedia unit 2027, and a power supply unit 2028. The elements of the main screen device 2020 may perform the same or similar functions as the elements of the companion screen device 2010, and a detailed description thereof is omitted.

Figure 21:
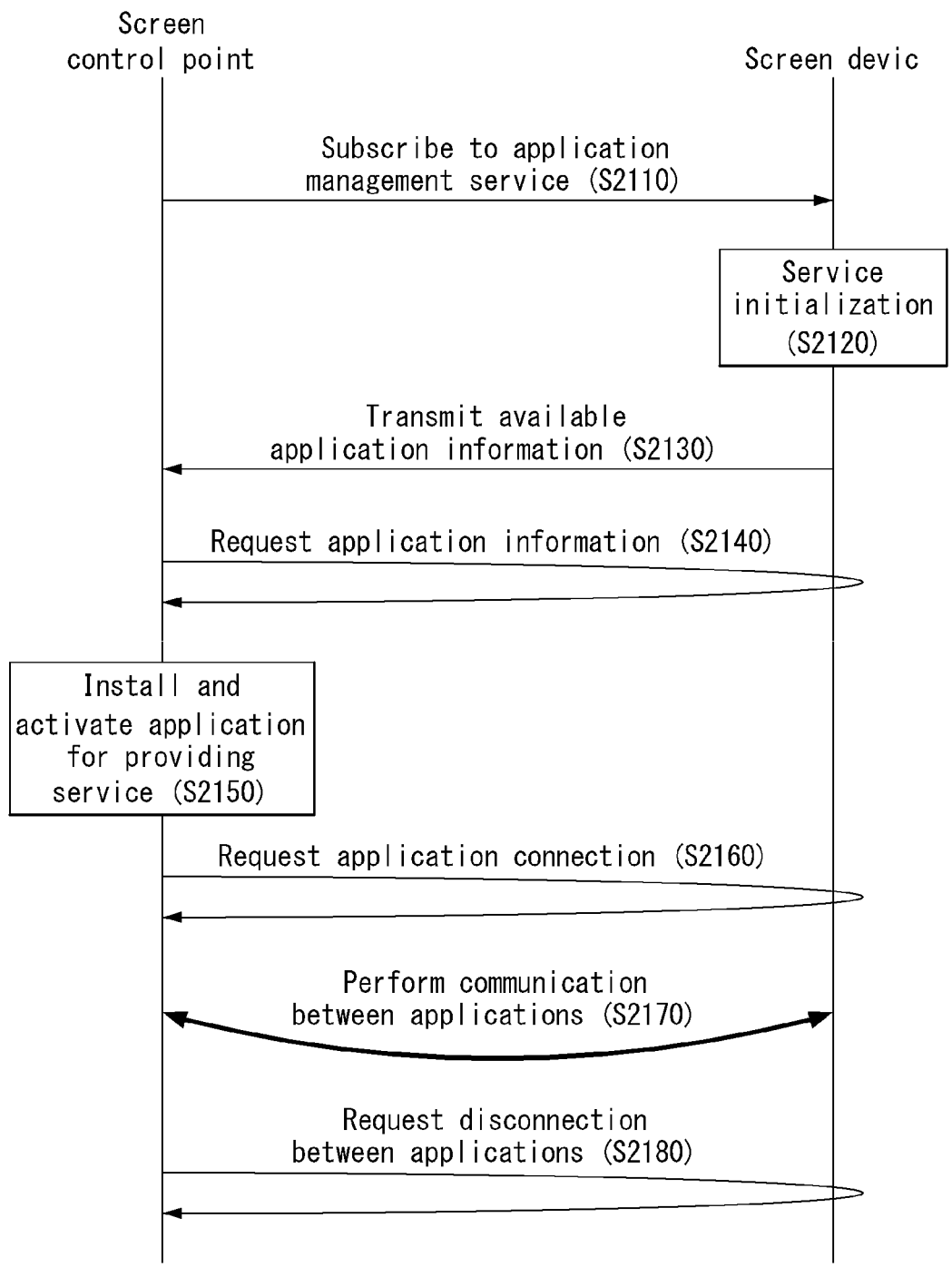
FIG. 21 is a flowchart illustrating an interaction between devices when a multi-screen service is initiated by a screen device, which is an embodiment to which the present invention is applied.

FIG. 21 is a flowchart illustrating an interaction between devices when a multi-screen service is initiated by a screen device according to an embodiment to which the present invention may be applied.

A screen control point may subscribe to an application management service in order to provide a multi-screen service (S2110).

If a screen device checks that the screen control point has subscribed to the application management service, it may perform service initialization (S2120).

After the service initialization, the screen device may transmit available application information (S2130). In this case, the available application information may be transmitted as an event message directly by the screen device or may be transmitted as a response message for a request from the screen control point. In this case, such a process may not be essential for an apptoapp connection.

The screen control point may request specific application information from the screen device (S2140). The screen device may transmit the specific application information to the screen control point in response to the request (S2140). In this case, the specific application information may be the entire application information or information about a designated application.

The screen control point may receive the specific application information, may install an application for providing the multi-screen service based on the received specific application information, and may execute the application (S2150).

When the application is executed, the screen control point may request a connection between applications from the screen device (S2160). In this case, an apptoapp connection (i.e., a connection between applications) action may be used. The screen device may transmit a connection identifier to the screen control point in response to the request (S2160).

When the connection between applications is established through such a process, the screen control point and the screen device may perform communication through the applications (S2170).

Thereafter, if additional communication is not required, the screen control point may request a disconnection between the applications from the screen device (S2180). In this case, an application disconnection action "DisconnectApptoApp( )" may be used. The screen device may transmit disconnection information to the screen control point in response to the request (S2180).

Figure 22:
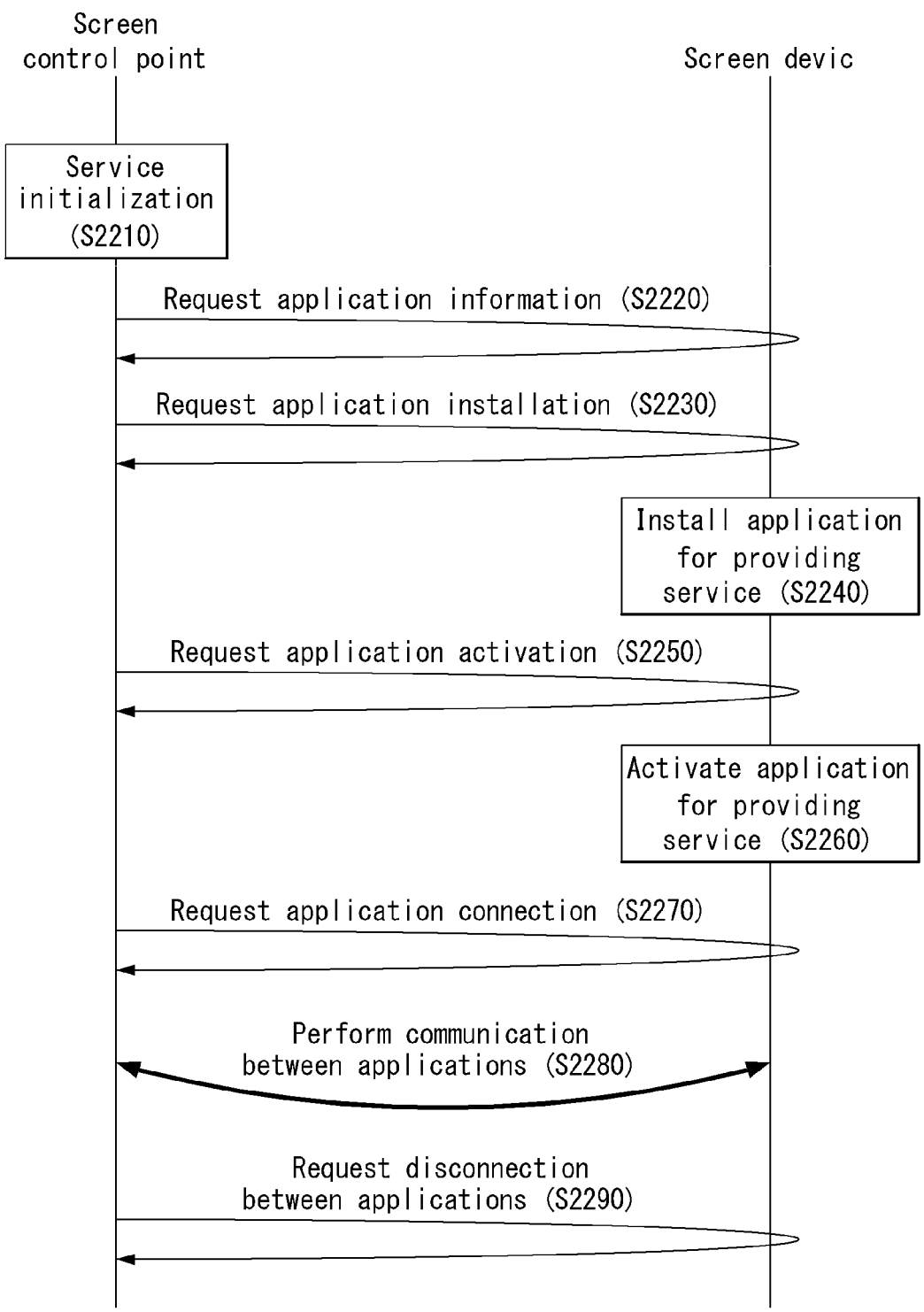
FIG. 22 is a flowchart illustrating an interaction between devices when a multi-screen service is initiated by a controller, which is an embodiment to which the present invention is applied.

FIG. 22 is a flowchart illustrating an interaction between devices when a multi-screen service is initiated by a controller according to an embodiment to which the present invention may be applied.

A screen control point may perform service initialization in order to provide a multi-screen service (S2210).

After the service initialization, the screen control point may request application information from a screen device (S2220). In this case, an application information request action may be used. The screen device may transmit the application information to the screen control point in response to the request (S2220).

The screen control point may request application installation from the screen device (S2230). In this case, an application installation action may be used. The application installation action may be performed based on an application identifier or a Uniform Resource Identifier (URI).

The screen device may install an application for providing the multi-screen service in response to the application installation request (S2240).

Furthermore, the screen control point may request application activation from the screen device (S2250). In this case, an application activation action may be used. The application activation action may include the identifier of an application to be activated. The screen device may execute the application in response to the request (S2260).

When the application is executed as described above, the screen control point may request an apptoapp connection from the screen device (S2270). In this case, an apptoapp connection action may be used. The screen device may transmit a connection identifier to the screen control point in response to the request (S2270).

When the connection between applications is established through such a process, the screen control point and the screen device may perform communication through the applications (S2280).

Thereafter, if additional communication is not required, the screen control point may request a disconnection between the applications from the screen device (S2290). In this case, an application disconnection action may be used. The screen device may transmit disconnection information to the screen control point in response to the request (S2290).

Figure 23:
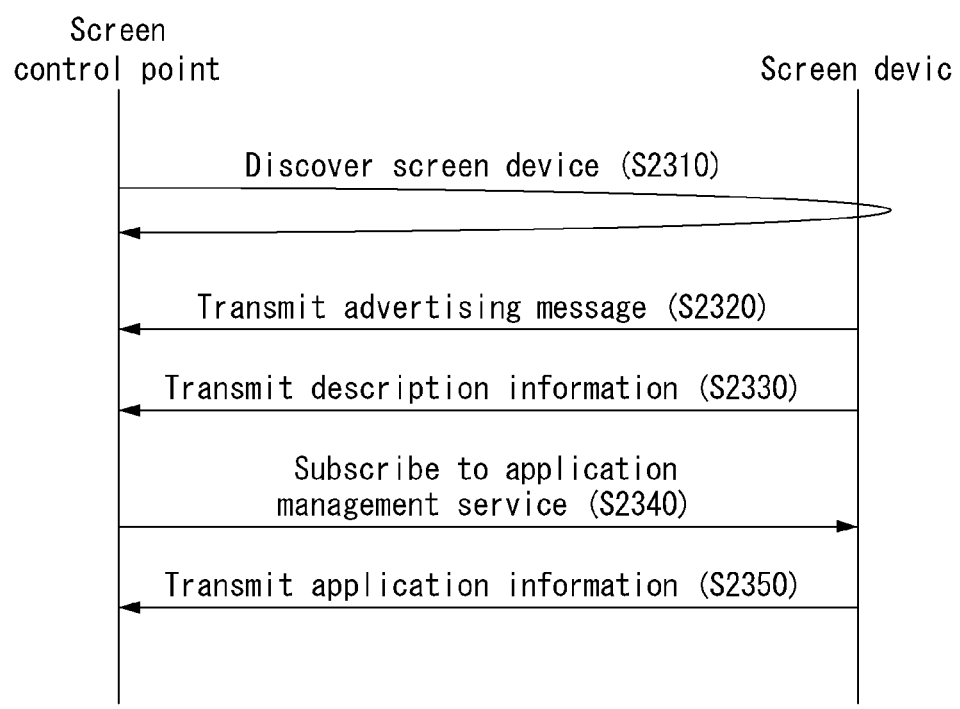
FIG. 23 is a flowchart illustrating an interaction for managing a connection between the applications of devices, which is an embodiment to which the present invention is applied.

FIG. 23 is a flowchart illustrating an interaction for managing an application connection between devices according to an embodiment to which the present invention may be applied.

A screen control point may discover a screen device in order to provide a multi-screen service (S2310). In this case, a discovery action may be used. If, as a result of the discovery, the screen device is discovered, the discovered screen device may transmit a response message for the discovery action. For example, the screen device may advertise that it is the screen device, and may advertise an address from which device description document including its own information may be accessed (S2320).

Furthermore, the screen device may transmit description information to the screen control point (S2330). For example, the description information may include basic device information, information regarding that it is what type of device (e.g., a screen device or a screen control point), and information about a service that may be provided by a device itself (e.g., an application management service or an application connection service).

The screen control point may subscribe to an application management service in order to provide the multi-screen service (S2340). If an event message from the screen device does not need to be received, the screen control point may not subscribe to the application management service. In this case, the screen control point may periodically check information related to the screen device.

The screen device may transmit application information to the screen control point (S2350). In this case, the application information may be the entire application information of the screen device or information about a designated application.

Figure 24:
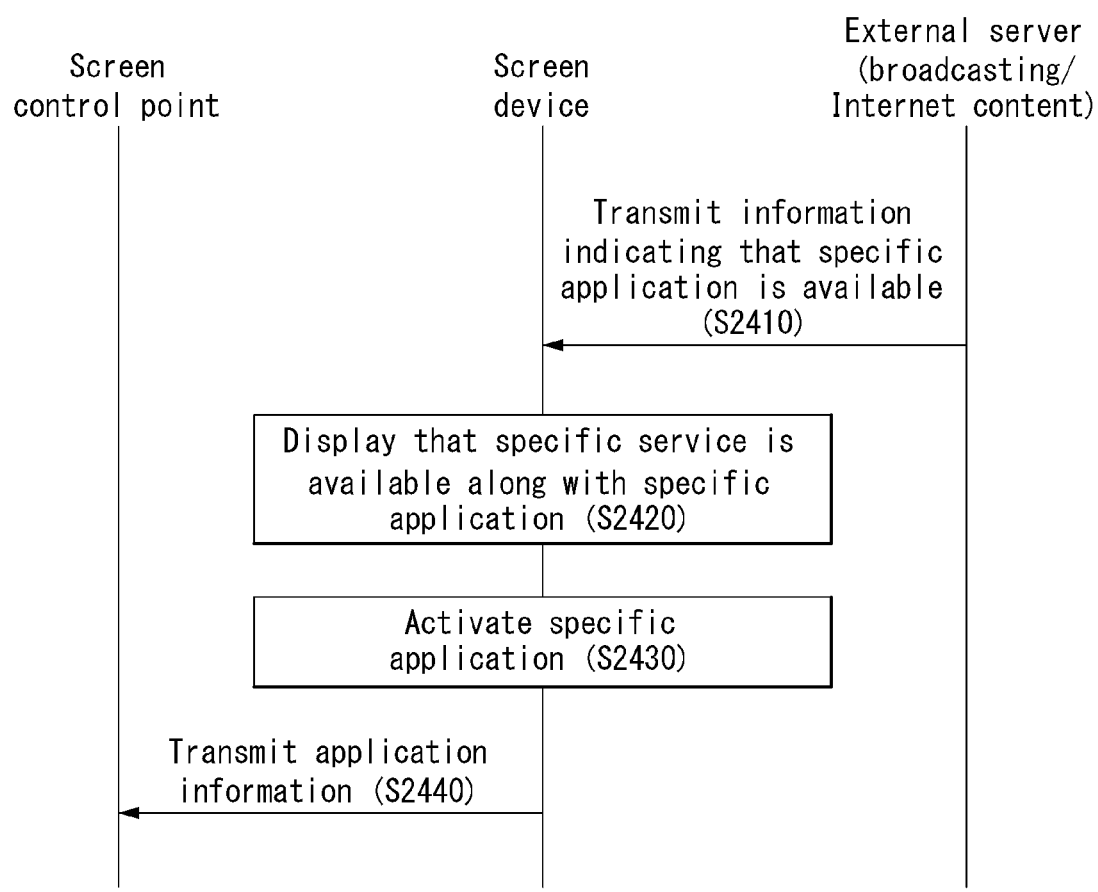
FIG. 24 is a flowchart illustrating a process for controlling an application which is used along with content if the content is provided by an external server, which is an embodiment to which the present invention is applied.

FIG. 24 is a flowchart illustrating a process for controlling an application which is used along with content if the content is provided by an external server according to an embodiment to which the present invention may be applied.

A screen device may receive content from an external server. Furthermore, the screen device may require a specific application in order to use the content. In this case, the content may be broadcasting content or may be content downloadable from the Internet.

The screen device may receive information about an available specific application from the external server (S2410).

When the screen device receives the information, it may display that a specific service is available along with the specific application (S2420). Furthermore, the screen device may activate the specific application (S2430). The activation may be automatically performed by the screen device or may be performed in response to a user input.

The screen device may transmit specific application information to the screen control point in order to provide a multi-screen service (S2440).

Figure 25:
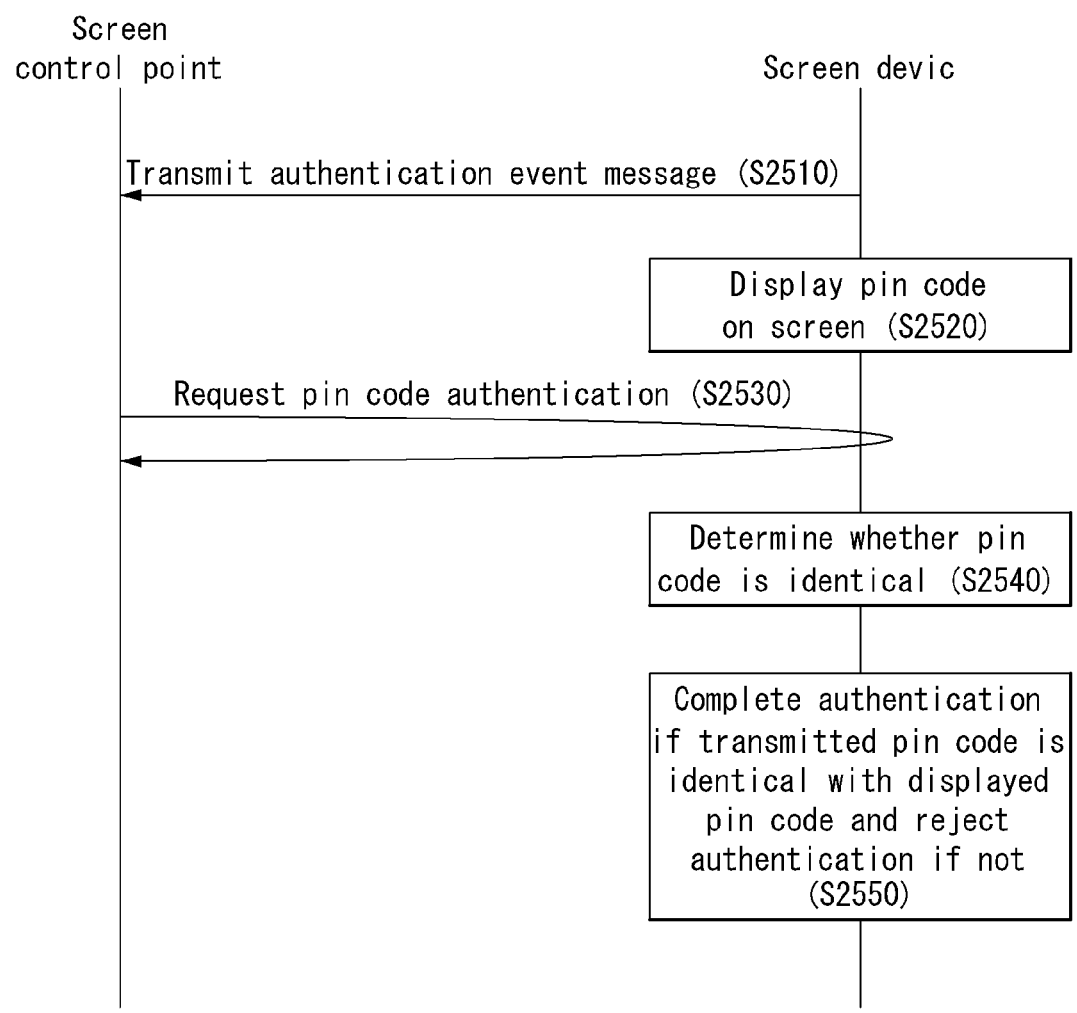
FIG. 25 is a flowchart illustrating an authentication process necessary for a connection between the applications of devices, which is an embodiment to which the present invention is applied.

FIG. 25 is a flowchart illustrating an authentication process necessary for an application connection between devices according to an embodiment to which the present invention may be applied.

A screen device may transmit an event message to only a screen control point that needs to be authenticated (S2510). For example, if a screen control point that requires authentication is present, the screen device changes an authentication variable value and transmits the changed value to the screen control point. In this case, the authentication variable value may be displayed on a screen (S2520).

When the screen control point receives the event message, it may recognize that it requires authentication. Furthermore, the screen control point may request pin-code authentication from the screen device. In this case, the request may be performed by a pin-code authentication action. The pin-code authentication action is used to authenticate an action transmission device or to authenticate the user of an action transmission device.

When the screen device receives the pin-code authentication action, it may check whether the received pin code is the same as the pin code of the screen device (S2540).

If, as a result of the check, the pin code transmitted by the action transmission device is found to be the same as the pin code of the screen device, the action transmission device may be authenticated. If not, the authentication of the action transmission device will be rejected (S2550).

Authentication information, such as the pin code, may be valid for only a limited time. For example, if a service subscription expires or a service subscription has not been performed, the screen control point may experience an authentication procedure again when subscribing to a service.

Figure 26:
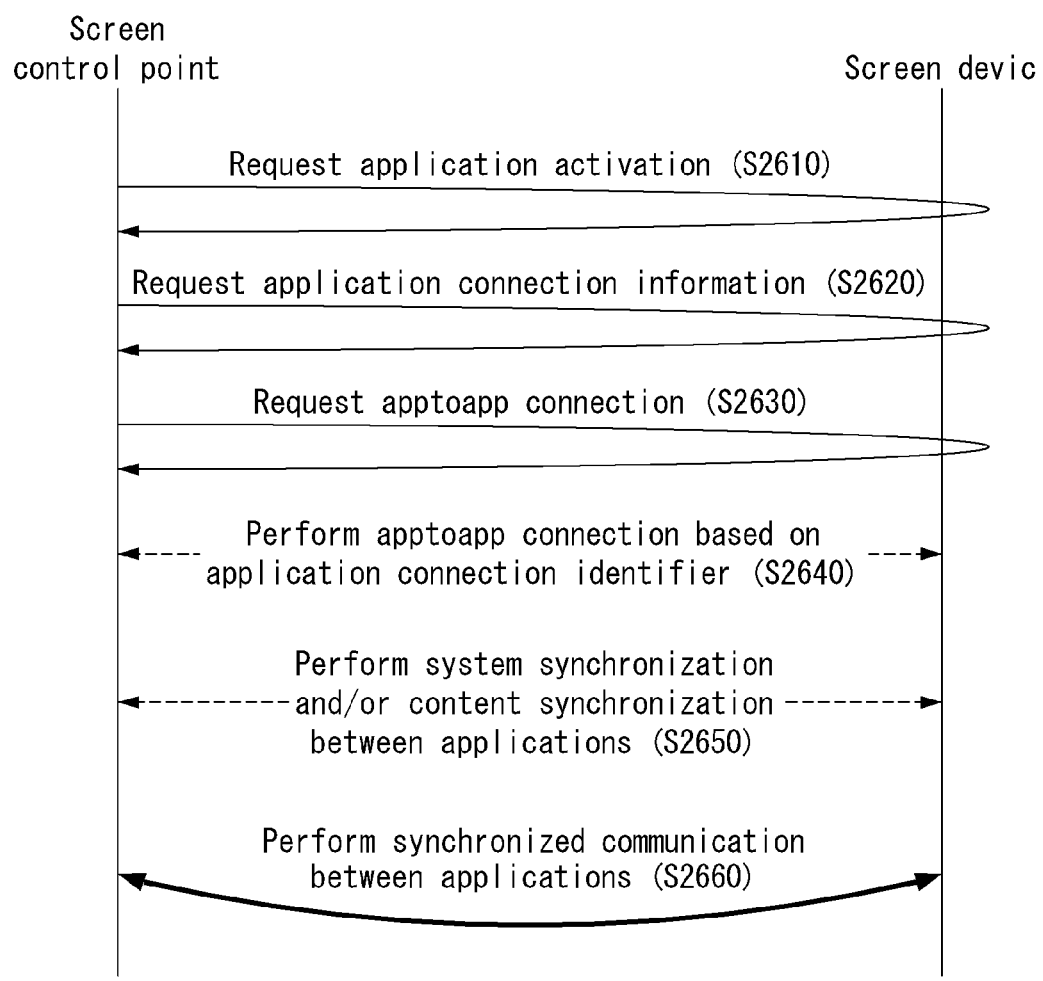
FIG. 26 is a flowchart illustrating a process for performing synchronized communication through a connection between the applications of devices, which is an embodiment to which the present invention is applied.

FIG. 26 is a flowchart illustrating a process for performing synchronized communication through an application connection between devices according to an embodiment to which the present invention may be applied.

A screen control point may request application activation from a screen device (S2610). In this case, an application activation action may be used. The application activation action may include the identifier of an application to be activated. The screen device may execute the application in response to the request.

When the application is executed as described above, the screen control point may request application connection information from the screen device (S2620). In this case, a connection information-obtaining action may be used. The screen device may transmit connection information to the screen control point in response to the request. In this case, the connection information may include a specific portion of an application information list. The connection information may be indicative of information between applications "apptoappinfo." For example, the information between applications "apptoappinfo" may include at least one of specific protocol name information, transport protocol information, and connection address information. In this case, the connection address information may mean access information for communication between applications.

The screen control point may request an apptoapp connection from the screen device based on the connection information (S2630). In this case, an apptoapp connection action may be used. The screen device may transmit a connection identifier to the screen control point in response to the request.

When the apptoapp connection is established through such a process (S2640), the screen control point and the screen device may perform system synchronization and/or content synchronization between applications (S2650).

Furthermore, the screen control point and the screen device may perform synchronized communication through the applications (S2660).

FIGS. 27 to 43 illustrate actions for application management and arguments thereof according to embodiments to which the present invention may be applied.

Action names shown in FIGS. 27 to 43 are only an embodiment, and the present invention should not be construed as being limited to the action names, but should be construed as meanings described in this specification. Furthermore, in the directions of an argument, "IN" may be construed as being input information and "OUT" may be construed as being output information.

FIG. 27 shows a first application information-obtaining action and arguments thereof according to an embodiment to which the present invention may be applied.

The first application information-obtaining action 2700 may enable a screen control point to obtain application information specified by an application identifier. Furthermore, the name of the first application information-obtaining action may be indicated as SearchAppinfo( ) or GetAppInfo( ).

The arguments of the first application information-obtaining action may include at least one of an application identifier 2710, reference information 2720, device profile information 2730, filter information 2740, and application information 2750.

In this case, the application identifier 2710 is indicative of information to identify an application from which information is to be obtained. For example, when a specific value "XYZ" is inputted, the application identifier 2710 may be indicative of an application identified by the specific value "XYZ." When a specific value "*" or "(empty string)" is inputted, the application identifier 2710 may mean all the applications of an application information list.

The reference information 2720 is indicative of information to determine the status of an application. For example, the reference information 2720 may be used to determine whether information is information about an available application, information about an activation application, or information about a specific application.

The device profile information 2730 is indicative of information about the profile of a corresponding device. For example, if the device profile information is indicative of resolution "1920×1080," application information satisfying the resolution may be obtained.

The filter information 2740 is indicative of information which is used to obtain application information satisfying a specific condition.

The application information 2750 is indicative of information about the type of arguments within various actions. For example, the application information 2750 may be a specific portion of an application information list variable. The application information list variable is described in detail later with reference to FIG. 38.

The embodiment of FIG. 27 may be performed by the elements of FIG. 20. For example, the controller 2013 of the first screen device 2010 may transmit the first application information-obtaining action to the second screen device 2020 through the network interface 2014.

The controller 2023 of the second screen device 2020 may receive the first application information-obtaining action through the network interface 2024. Furthermore, the controller 2023 of the second screen device 2020 may transmit application information to the first screen device 2010 in response to the first application information-obtaining action. In this case, the application information may be information about a specific application determined based on the input information of the first application information-obtaining action. The input information may include at least one of the application identifier 2710, the reference information 2720, the device profile information 2730, and the filter information 2740.

FIG. 28 shows a second application information-obtaining action and arguments thereof according to an embodiment to which the present invention may be applied.

The second application information-obtaining action 2800 may enable a screen control point to obtain only application information specified by an application identifier. Furthermore, the name of the second application information-obtaining action may be indicated as SimpleGetAppInfo( ).

The arguments of the second application information-obtaining action may include at least one an application identifier 2810 and application information 2820.

In this case, the description of FIG. 27 may be applied to the application identifier 2810 and the application information 2820.

The embodiment of FIG. 28 may be performed by the elements of FIG. 20. For example, the controller 2013 of the first screen device 2010 may transmit the second application information-obtaining action to the second screen device 2020 through the network interface 2014.

The controller 2023 of the second screen device 2020 may receive the second application information-obtaining action through the network interface 2024. Furthermore, the controller 2023 of the second screen device 2020 may transmit application information to the first screen device 2010 in response to the second application information-obtaining action. In this case, the application information may be information about a specific application determined based on the input information of the second application information-obtaining action. The input information may include the application identifier 2210.

FIG. 29 shows an available application information-obtaining action and arguments thereof according to an embodiment to which the present invention may be applied.

The available application information-obtaining action 2900 may enable information about an available application to be obtained from an action reception device. Furthermore, the name of the available application information-obtaining action 2900 may be indicated as GetAvailableApp( ) 2900.

The arguments of the available application information-obtaining action 2900 may include at least one of an application identifier 2910, reference information 2920, device profile information 2930, filter information 2940, and available application information 2950.

In this case, the description of FIG. 21 may be applied to the application identifier 2910, the reference information 2920, the device profile information 2930, and the filter information 2940.

The available application information 2950 may mean information about an available application in order to provide a multi-screen service.

The embodiment of FIG. 29 may be performed by the elements of FIG. 20. For example, the controller 2013 of the first screen device 2010 may transmit the available application information-obtaining action 2900 to the second screen device 2020 through the network interface 2014.

The controller 2023 of the second screen device 2020 may receive the available application information-obtaining action 2000 through the network interface 2024. Furthermore, the controller 2023 of the second screen device 2020 may transmit available application information to the first screen device 2010 in response to the available application information-obtaining action 2900. In this case, the available application information may be determined based on the input information of the second application information-obtaining action. The input information may include at least one of the application identifier 2910, the reference information 2920, the device profile information 2930, and the filter information 2940.

FIG. 30 shows a running application information-obtaining action and an argument thereof according to an embodiment to which the present invention may be applied.

The running application information-obtaining action 3000 may enable a screen control point to obtain a list of applications that are being executed. Furthermore, the name of the running application information-obtaining action 3000 may be indicated as GetRunningApp( ).

The arguments of the running application information-obtaining action 3000 may include application information 3010 that is running.

In this case, the application information 3010 that is running may mean a list of applications that are being executed. For example, the application information 3010 that is running may mean a list of the identifiers of applications in which a variable "running status information ("RunningStatus") included in an application information list has been set as "Running."

The embodiment of FIG. 30 may be performed by the elements of FIG. 20. For example, the controller 2013 of the first screen device 2010 may transmit the running application information-obtaining action 3000 to the second screen device 2020 through the network interface 2014.

The controller 2023 of the second screen device 2020 may receive the running application information-obtaining action 3000 through the network interface 2024. Furthermore, the controller 2023 of the second screen device 2020 may transmit application information that is running to the first screen device 2010 in response to the running application information-obtaining action 3000.

FIG. 31 shows a running status information-obtaining action and arguments thereof according to an embodiment to which the present invention may be applied.

The running status information-obtaining action 3100 may enable a screen control point to obtain running status information about an application specified by an application identifier. Furthermore, the name of the running status information-obtaining action 3100 may be indicated as GetRunningStatus( ).

The arguments of the running status information-obtaining action 3100 may include an application identifier 3110 and running status information 3120.

In this case, the application identifier 3110 is indicative of an application for obtaining running status information. The contents described in connection with the aforementioned embodiments may be likewise applied to the application identifier 3110.

The running status information "RunningStatus" 3120 may be indicative of a specific portion of an application information list. The running status information 3120 may include the components and attributes of an application specified by the application identifier 3110 and running status components thereof.

The embodiment of FIG. 31 may be performed by the elements of FIG. 20. For example, the controller 2013 of the first screen device 2010 may transmit the running status information-obtaining action 3100 to the second screen device 2020 through the network interface 2014.

The controller 2023 of the second screen device 2020 may receive the running status information-obtaining action 3100 through the network interface 2024. Furthermore, the controller 2023 of the second screen device 2020 may transmit the running status information 3120 of an application that is running to the first screen device 2010 in response to the running status information-obtaining action 3100.

FIG. 32 shows a first application activation action and arguments thereof according to an embodiment to which the present invention may be applied.

The first application activation action 3200 may enable an application, included in an application information list, to run on a screen device. The application may be identified by an application identifier. Furthermore, the first application activation action 3200 may be used to provide the activation parameter information of an application that is running. Furthermore, the name of the first application activation action 3200 may be indicated as ActivateAppByID( ).

The arguments of the first application activation action 3200 may include an application identifier 3210 and parameter information 3220.

In this case, the application identifier 3210 is indicative of an application to be activated. The contents described in connection with the aforementioned embodiments may be likewise applied to the application identifier 3210.

The parameter information 3220 may be indicative of a parameter type. For example, the parameter type may be indicative of any one of activation parameter information and installation parameter information.

The embodiment of FIG. 32 may be performed by the elements of FIG. 20. For example, the controller 2013 of the first screen device 2010 may transmit the first application activation action 3200 to the second screen device 2020 through the network interface 2014.

The controller 2023 of the second screen device 2020 may receive the first application activation action 3200 through the network interface 2024. Furthermore, the controller 2023 of the second screen device 2020 may activate an application within the second screen device 2020 in response to the first application activation action 3200.

FIG. 33 shows a second application activation action and arguments thereof according to an embodiment to which the present invention may be applied.

The second application activation action 3300 may enable an application to run on a screen device using a URI. Furthermore, the second application activation action 3300 may be used to provide activation parameter information about an application that is subjected to transitioning pending input. Furthermore, the name of the second application activation action 3300 may be indicated as ActivateAppByURI( ).

The arguments of the second application activation action 3300 may include at least one of activation URI information 3310, application information 3320, parameter information 3330, and an application identifier 3340.

In this case, the activation URI information 3310 is indicative of information about a URI from which an application will start.

The application information 3320 may be indicative of a specific portion of an application information list variable and may provide additional information about an application to be started. For example, the application information 3320 may include a name set by a user.

The parameter information 3330 may be indicative of a parameter type. For example, the parameter type may be indicative of any one of activation parameter information and installation parameter information.

The application identifier 3340 may be indicative of the identifier of a newly assigned application or may be indicative of the identifier of an application having the same URI as that of the activation URI information 3310. If an application is not installed and may be started using a URI and the activation URI information 3310 is not included in the application information list variable of a screen device, the screen device may start the application through the second application activation action 3300.

For example, when receiving the second application activation action 3300, a screen device may generate a new application component in an application information list. In this case, the new application component may include activation URI information and additional information. Furthermore, a new value may be assigned to an application identifier, and the new value may be returned through the application identifier 3340.

The embodiment of FIG. 33 may be performed by the elements of FIG. 20. For example, the controller 2013 of the first screen device 2010 may transmit the second application activation action 3300 to the second screen device 2020 through the network interface 2014.

The controller 2023 of the second screen device 2020 may receive the second application activation action 3300 through the network interface 2024. Furthermore, the controller 2023 of the second screen device 2020 may activate an application within the second screen device 2020 in response to the second application activation action 3300. That is, the controller 2023 may activate an application based on information about a URI from which the application will start. The activated application may be returned through the display 2021.

FIG. 34 shows a deactivation action and arguments thereof according to an embodiment to which the present invention may be applied.

The deactivation action 3400 may enable a designated application to be stopped by an application identifier on a screen device. The name of the deactivation action 3400 may be indicated as DeactivateApp( ).

The arguments of the deactivation action 3400 may include an application identifier 3410 and a stopped application identifier 3420.

In this case, the application identifier 3410 is indicative of an application to be deactivated. The contents described in connection with the aforementioned embodiments may be likewise applied to the application identifier 3410.

The stopped application identifier 3420 is indicative of a list of the identifiers of stopped applications.

The embodiment of FIG. 34 may be performed by the elements of FIG. 20. For example, the controller 2013 of the first screen device 2010 may transmit the deactivation action 3400 to the second screen device 2020 through the network interface 2014.

The controller 2023 of the second screen device 2020 may receive the deactivation action 3400 through the network interface 2024. Furthermore, the controller 2023 of the second screen device 2020 may stop an application within the second screen device 2020 in response to the deactivation action 3400. The stopped application may be controlled by a user through the user interfaces 2012 and 2022.

FIG. 35 shows a first application installation action and arguments thereof according to an embodiment to which the present invention may be applied.

The first application installation action 3500 may enable an application to be installed on a screen device using information included in an application information list. Furthermore, the first application installation action 3500 may be used to provide the installation parameter information of an application that is subjected to installing-pending input. Furthermore, if the latest version is present, the first application installation action 3500 may be used to update an installed application with the latest version. The name of the first application installation action 3500 may be indicated as InstallAppByID( ).

The arguments of the first application installation action 3500 may include an application identifier 3510 and parameter information 3520.

In this case, the application identifier 3510 is indicative of an application to be installed. The contents described in connection with the aforementioned embodiments may be likewise applied to the application identifier 3510.

The parameter information 3520 may be indicative of a parameter type. For example, the parameter type may be indicative of any one of activation parameter information and installation parameter information.

The embodiment of FIG. 35 may be performed by the elements of FIG. 20. For example, the controller 2013 of the first screen device 2010 may transmit the first application installation action 3500 to the second screen device 2020 through the network interface 2014. In this case, the first application installation action 3500 may include the application identifier 3510 and the parameter information 3520 as input information.

The controller 2023 of the second screen device 2020 may receive the first application installation action 3500 through the network interface 2024. Furthermore, the controller 2023 of the second screen device 2020 may install an application in response to the first application installation action 3500.

FIG. 36 shows a second application installation action and arguments thereof according to an embodiment to which the present invention may be applied.

The second application installation action 3600 may enable an application to be installed on a screen device using a URI. Furthermore, the second application installation action 3600 may be used to provide the installation parameter information of an application that is subjected to installing-pending input. Furthermore, the name of the second application installation action 3600 may be indicated as InstallAppByURI.

The arguments of the second application installation action 3600 may include at least one of installation URI information 3610, application information 3620, parameter information 3630, and an application identifier 3640.

In this case, the installation URI information 3610 is indicative of information about a URL at which an application will be installed.

The application information 3620 may be indicative of a specific portion of an application information list variable and may provide additional information about an application to be installed. For example, the application information 3620 may include a name set by a user.

The parameter information 3630 may be indicative of a parameter type. For example, the parameter type may be indicative of any one of activation parameter information and installation parameter information.

The application identifier 3640 may be indicative of the identifier of a newly assigned application or may be indicative of the identifier of an application having the same URI as that of the installation URI information 3610. If the installation URI information 3610 is not included in the application information list variable of a screen device, the second application installation action 3600 may enable an application to be installed on a screen device.

For example, when the controller 2023 of the second screen device 2020 receives the second application installation action 3600 through the network interface 2024, it may generate a new application component within an application information list variable. In this case, the new application component may include installation URI information and additional information. Furthermore, the controller 2023 may assign a new value to an application identifier and return the new value through the application identifier 3640. The controller 2023 may transmit the application identifier 3640 to which the new value has been assigned to the first screen device 2010 through the network interface 2024.

FIG. 37 shows an uninstallation action and arguments thereof according to an embodiment to which the present invention may be applied.

The uninstallation action 3700 may enable an application designated by an application identifier to be uninstalled from a screen device. The name of the uninstallation action 3700 may be indicated as UninstallApp( ).

The arguments of the uninstallation action 3700 may include an application identifier 3710 and an uninstalled application identifier 3720.

In this case, the application identifier 3710 may be indicative of an application to be uninstalled. The contents described in connection with the aforementioned embodiments may be likewise applied to the application identifier 3710.

The uninstalled application identifier 3720 is indicative of a list of the identifiers of uninstalled applications.

The embodiment of FIG. 37 may be performed by the elements of FIG. 20. For example, the controller 2013 of the first screen device 2010 may transmit the uninstallation action 3700 to the second screen device 2020 through the network interface 2014. In this case, the uninstallation action 3700 may include the application identifier 3710 as input information.

The controller 2023 of the second screen device 2020 may receive the uninstallation action 3700 through the network interface 2024. Furthermore, the controller 2023 of the second screen device 2020 may transmit the identifier of an uninstalled application to the first screen device 2010 in response to the uninstallation action 3700.

FIG. 38 shows an installation status information-obtaining action and arguments thereof according to an embodiment to which the present invention may be applied.

The installation status information-obtaining action 3800 may enable a screen control point to obtain installation status information about an application specified by an application identifier. Furthermore, the name of the installation status information-obtaining action 3800 may be indicated as GetAppInstallationStatus( ).

The arguments of the installation status information-obtaining action 3800 may include an application identifier 3810 and installation status information 3820.

In this case, the application identifier 3810 may be indicative of an application for obtaining installation status information. The contents described in connection with the aforementioned embodiments may be likewise applied to the application identifier 3810.

The installation status information "InstallationStatus" 3820 may be indicative of a specific portion of an application information list. The installation status information 3820 may include the components and attributes of an application specified by the application identifier 3810 and an installation status component thereof. For example, the installation status component may include "Installation Completed", "Download Pending", and "Installation Pending."

The embodiment of FIG. 38 may be performed by the elements of FIG. 20. For example, the controller 2013 of the first screen device 2010 may transmit the installation status information-obtaining action 3800 to the second screen device 2020 through the network interface 2014.

In this case, the installation status information-obtaining action 3800 may include the application identifier 3810 as input information.

The controller 2023 of the second screen device 2020 may receive the installation status information-obtaining action 3800 through the network interface 2024. Furthermore, the controller 2023 of the second screen device 2020 may transmit any one of the pieces of installation status information, that is, "Installation Completed", "Download Pending", and "Installation Pending", to the first screen device 2010 in response to the installation status information-obtaining action 3800.

FIG. 39 shows a connection information-obtaining action and arguments thereof according to an embodiment to which the present invention may be applied.

The connection information-obtaining action 3900 may enable a screen control point to obtain information about the connection of applications specified by an application identifier. Furthermore, the name of the connection information-obtaining action 3900 may be indicated as GetAppConnectionInfo( ).

The arguments of the connection information-obtaining action 3900 may include an application identifier 3910 and connection information 3920.

In this case, the application identifier 3910 may be indicative of an application for obtaining connection information. The contents described in connection with the aforementioned embodiments may be applied to the application identifier 3910.

The connection information 3920 may be indicative of a specific portion of an application information list. The connection information 3920 may include the components and attributes of applications specified by the application identifier 3910 and information components between the applications. For example, the information components between the applications may include at least one of specific protocol name information, transport protocol information, and connection address information. In this case, the connection address information may mean access information for communication between the applications.

The embodiment of FIG. 39 may be performed by the elements of FIG. 20. For example, the controller 2013 of the first screen device 2010 may transmit the connection information-obtaining action 3900 to the second screen device 2020 through the network interface 2014. In this case, the connection information-obtaining action 3900 may include the application identifier 3910 as input information.

The controller 2023 of the second screen device 2020 may receive the connection information-obtaining action 3900 through the network interface 2024. Furthermore, the controller 2023 of the second screen device 2020 may transmit the connection information 3920, for example, at least one of the specific protocol name information, the transport protocol information, and the connection address information to the first screen device 2010 in response to the connection information-obtaining action 3900.

The first screen device 2010 and the second screen device 2020 are connected through the network interfaces 2014 and 2024 based on the connection information 3920, thus being capable of communicating with each other.

FIG. 40 shows an apptoapp connection action and arguments thereof according to an embodiment to which the present invention may be applied.

The apptoapp connection action 4000 is used to configure a screen device and an apptoapp connection and enables connection management. The name of the apptoapp connection action 4000 may be indicated as ConnectApptoApp( ).

The arguments of the apptoapp connection action 4000 may include an application identifier 4010 and a connection identifier 4020.

In this case, the application identifier 4010 is indicative of an application for configuring a screen device and an apptoapp connection.

The connection identifier 4020 is indicative of the identifier of the configured apptoapp connection and may be assigned by a screen device.

The embodiment of FIG. 40 may be performed by the elements of FIG. 20. For example, the controller 2013 of the first screen device 2010 may transmit the apptoapp connection action 4000 to the second screen device 2020 through the network interface 2014. In this case, the apptoapp connection action 4000 may include the application identifier 4010 as input information.

The controller 2023 of the second screen device 2020 may receive the apptoapp connection action 4000 through the network interface 2024. Furthermore, the controller 2023 of the second screen device 2020 may transmit the connection identifier 4020 to the first screen device 2010 in response to the apptoapp connection action 4000.

The first screen device 2010 and the second screen device 2020 may perform a connection for providing a multi-screen service based on the connection identifier 4020.

FIG. 41 shows an apptoapp disconnection (i.e., a disconnection between applications) action and arguments thereof according to an embodiment to which the present invention may be applied.

The application disconnection action 4100 may be used to disconnect an apptoapp connection, specified by a connection identifier, from a screen device. The name of the application disconnection action 4100 may be indicated as DisconnectApptoApp( ).

The arguments of the application disconnection action 4100 may include a connection identifier 4110 and a disconnected connection identifier 4120.

In this case, the connection identifier 4110 is indicative of a connection to be disconnected, and the disconnected connection identifier 4120 is indicative of a list of the identifiers of disconnected apptoapp disconnections.

The embodiment of FIG. 41 may be performed by the elements of FIG. 20. For example, the controller 2013 of the first screen device 2010 may transmit the application disconnection action 4100 to the second screen device 2020 through the network interface 2014. In this case, the application disconnection action 4100 may include the connection identifier 4110 as input information.

The controller 2023 of the second screen device 2020 may receive the application disconnection action 4100 through the network interface 2024. Furthermore, the controller 2023 of the second screen device 2020 may transmit the disconnected connection identifier 4120 to the first screen device 2010 in response to the application disconnection action 4100.

A connection between the first screen device 2010 and the second screen device 2020 is disconnected based on the disconnected connection identifier 4120.

FIG. 42 shows a current connection information-obtaining action and arguments thereof according to an embodiment to which the present invention may be applied.

The current connection information-obtaining action 4200 enables a screen control point to collect apptoapp connection information which has been established by the apptoapp connection action and which is now supported by a screen device. The name of the current connection information-obtaining action 4200 may be indicated as GetCurentConnectionInfo( ).

The arguments of the current connection information-obtaining action 4200 may include a connection identifier 4210 and connection application identifiers 4220.

In this case, the connection identifier 4210 may be indicative of the identifier of a current apptoapp connection.

The connection application identifiers 4220 may be indicative of application identifiers corresponding to an apptoapp connection.

The embodiment of FIG. 42 may be performed by the elements of FIG. 20. For example, the controller 2013 of the first screen device 2010 may transmit the current connection information-obtaining action 4200 to the second screen device 2020 through the network interface 2014. In this case, the current connection information-obtaining action 4200 may include the connection identifier 4210 as input information.

The controller 2023 of the second screen device 2020 may receive the current connection information-obtaining action 4200 through the network interface 2024. Furthermore, the controller 2023 of the second screen device 2020 may transmit application identifiers corresponding to an apptoapp connection to the first screen device 2010 in response to the current connection information-obtaining action 4200.

FIG. 43 shows a searchable field-obtaining action and an argument thereof according to an embodiment to which the present invention may be applied.

The searchable field-obtaining action 4300 may enable a screen control point to obtain supported searchable field information. The name of the searchable field-obtaining action 4300 may be indicated as GetSupportedTargetFields( ).

The argument of the searchable field-obtaining action 4300 may include supported searchable field information 4310. In this case, the supported searchable field information 4310 is indicative of a list of searchable fields. This may be a component of the application information list of a screen device. The supported searchable field information 4310 may include at least one of an application name and protocol name generated by a user.

The embodiment of FIG. 43 may be performed by the elements of FIG. 20. For example, the controller 2013 of the first screen device 2010 may transmit the searchable field-obtaining action 4300 to the second screen device 2020 through the network interface 2014.

The controller 2023 of the second screen device 2020 may receive the searchable field-obtaining action 4300 through the network interface 2024. Furthermore, the controller 2023 of the second screen device 2020 may transmit the supported searchable field information 4310, for example, at least one of an application name and protocol name generated by a user to the first screen device 2010 in response to the searchable field-obtaining action 4300.

FIG. 44 shows state variables for application management according to an embodiment to which the present invention may be applied.

In an embodiment of the present invention, state variables for application management may include at least one of an application information list 4401, available application information 4402, searchable field information 4403, an application identifier 4404, search information 4405, searchable field information 4406, filter information 4407, a running application list 4408, URI information 4409, parameter information 4410, and a connection identifier 4411.

The application information list 4401 may include information about all of applications owned by a screen device for a multi-screen service. The application information list 4401 may be represented in an XML template form and may include a sub-component structure.

For example, the application information list 4401 may include an application component. If the number of application components is plural, the application information list 4401 may be indicative of a structure including the attributes and sub-components of applications for each application.

The application component may include at least one of an application identifier, a market application identifier component, a user description component, a replacement identifier component, a function element, a running status component, an activation URI component, an installation status component, a downloading status component, an installing status component, an installation URI component, a user policy component, an apptoapp information component, and an icon list component.

The application identifier is indicative of the unique identifier of an application within an application management service.

The market application identifier component is indicative of the identifier of an application assigned by an application market and may include market information and version information. In this case, the market information is indicative of the identifier of a digital platform through which the application is provided. The version information is indicative of the version of the application.

The user description component is indicative of the description words of an application generated by a user, and may include language information.

The replacement identifier component is indicative of the identifier of an application used in a standard institute, and may include institute information. The institute information may mean the domain name of the standard institute.

The running status component is indicative of the activation status of an application on a screen device. The activation status may be indicative of one of "Deactivation", "Transitioning", "Transitioning Pending Input", "Running", and "Unknown."

The activation URI component is indicative of a URI which may be accessible to a screen control point in order to start an application, and may include device type information. In this case, the device type information is indicative of a device type to which an application may be applied. The device type may mean a main screen device or a companion screen device or both.

The installation status component is indicative of the installation status of an application designated by an application identifier on a screen device. The installation status may be indicative of one of "Not Downloaded", "Downloading", "Downloading-Pending Input", "Not Installed", "Installing", "Installation-Pending Input", "Installation Completed", and "Unknown."

The downloading status component is applied only when the installation status component is "Downloading." The degree of downloading may be represented as a percentage between 0 and 100.

The installing status component is applied only when the installation status component is "Installing." The degree of installing may be represented as a percentage between 0 and 100.

The installation URI component is indicative of a URI which may be accessible to a screen control point in order to install an application, and may include device type information. In this case, the device type information is indicative of a device type to which the application may be applied. The device type may mean a main screen device or a companion screen device or both.

The user policy component is indicative of permission-related information for an application use. The permission-related information may be indicative of one of "No Restriction", "Purchase Required", "Trial Only", "Parental Consent Required", and "Login Required."

The apptoapp information component is indicative of information for generating an apptoapp connection and may be supported if the running status component is at least "Running." The apptoapp information component may include at least one of a matching protocol name component, a protocol component, and a connection address component. The matching protocol name component is indicative of a manufacturer-defined protocol name. The protocol component is indicative of the protocol of a transport layer and may include, for example, an HTTP, a websocket, and UPnP. The connection address component is indicative of access information for communication between applications. The connection address component may be, for example, an HTTP URI, a websocket URI, an uuid:device-uuid, and a manufacturer-defined address.

The available application information 4402 is indicative of information about applications available in a corresponding time in order to provide a multi-screen service.

The supported searchable field information 4403 is indicative of a list of searchable fields.

The application identifier argument 4404 provides information about the type of various application identifiers within various actions.

The search information argument 4405 is indicative of information about the type of search information.

The searchable field information argument 4406 is indicative of information about the type of searchable field information.

The filter information argument 4407 is indicative of information used to obtain application information that satisfies a specific condition.

The running application list 4408 provides a list of applications that are running.

The URI information argument 4409 is indicative of information about the type of any one of an activation URI argument and an installation URI argument.

The parameter information argument 4410 is indicative of information about the type of any one of an activation parameter argument and an installation parameter argument.

The connection identifier argument 4411 is indicative of a list of the unique identifiers of apptoapp connections.

Figure 45:
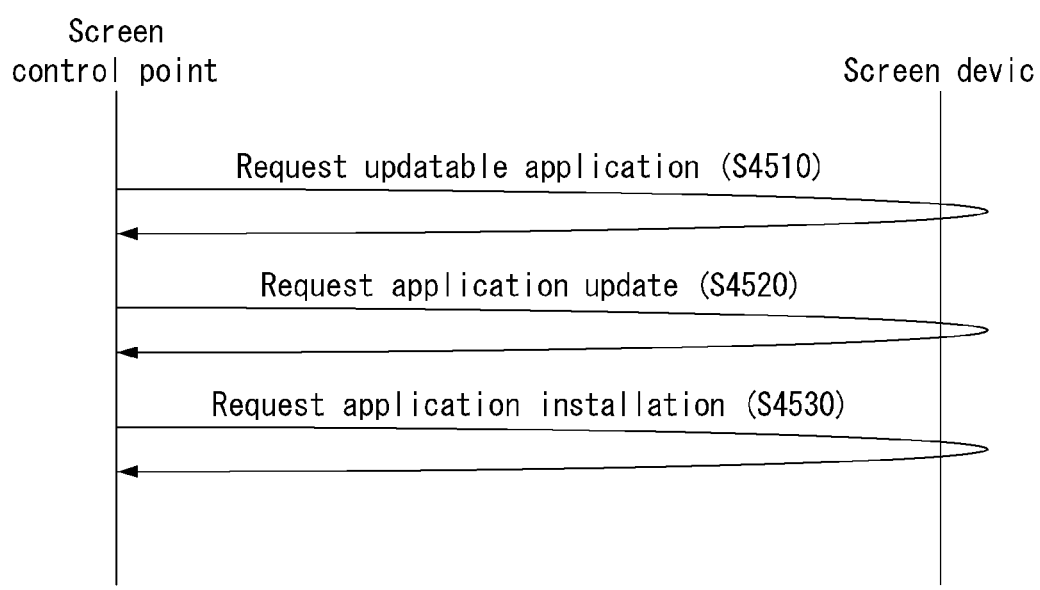
FIG. 45 shows a process for updating an application, which is an embodiment to which the present invention is applied.

FIG. 45 shows a process for updating an application according to an embodiment to which the present invention may be applied.

In order to update an application for providing a multi-screen service, at least one of an updatable application-obtaining action and an application update action may be required.

A screen control point may request a screen device to obtain an updatable application (S4510). In this case, an updatable application-obtaining action may be used. The updatable application-obtaining action may enable the screen control point to obtain a list of applications whose version may be updated. The screen device may transmit the list of applications whose version may be updated to the screen control point in response to the updatable application-obtaining action.

The screen control point may request an application update for applications not having the latest version (S4520). In this case, an application update action may be used. The application update action may include version information. If the version information has nothing information, it may mean that an application needs to be updated with the latest version. In response to the request, the screen device may update the applications not having the latest version with the latest version.

The screen control point may request the screen device to install the updated application thereon (S4530). In this case, an application installation action may be used. The application installation action may be installed based on an application identifier or may be performed based on an installation Uniform Resource Identifier (URI).

Figure 46:
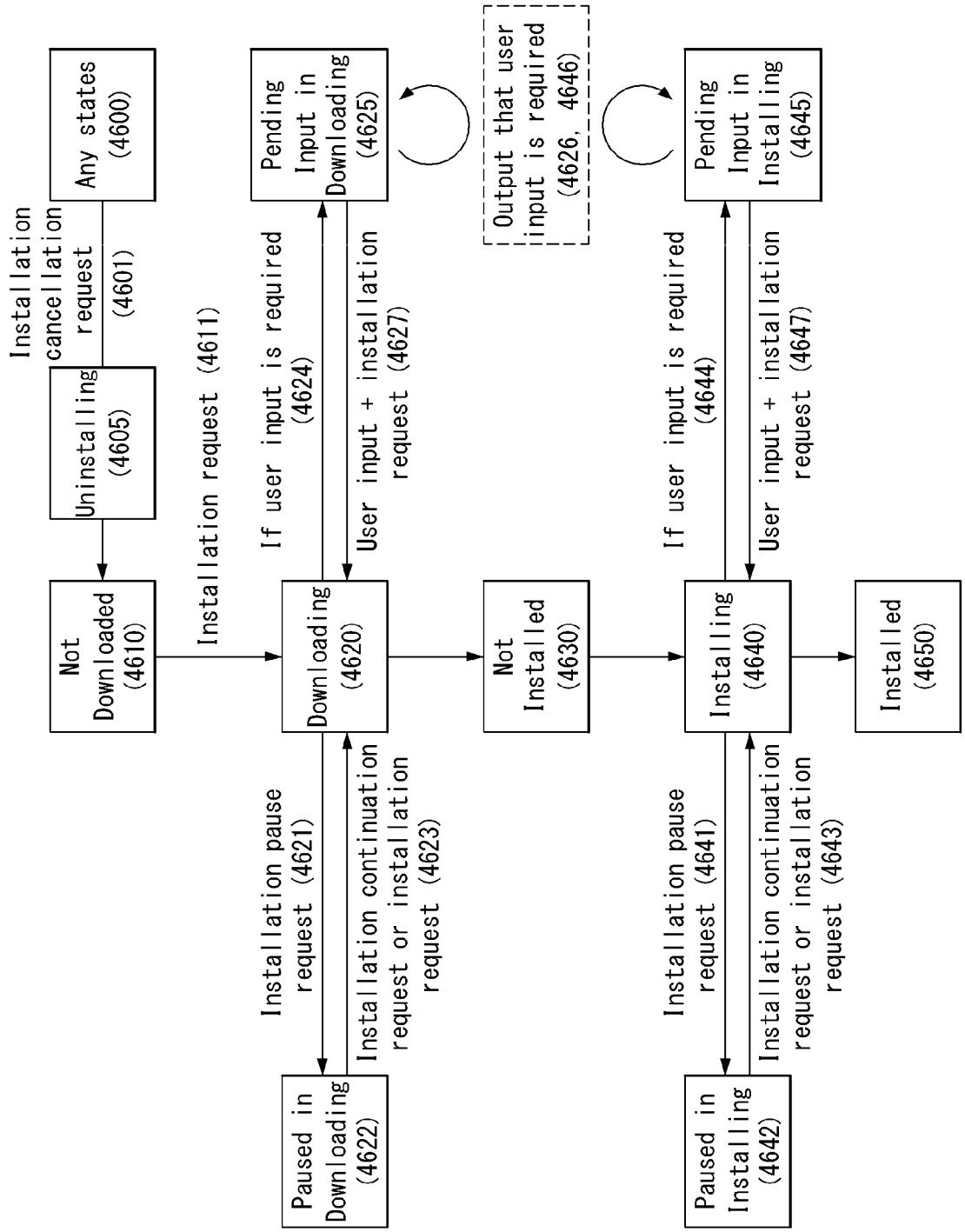
FIG. 46 shows the state diagram of the installation of an application, which is an embodiment to which the present invention is applied.

FIG. 46 shows the state diagram of the installation of an application according to an embodiment to which the present invention may be applied.

First, if an application has not been downloaded (4610), a user may request application installation through a screen control point (4611). In this case, it may consider that the application has not been downloaded although the application is uninstalled (4605) in response to an installation cancellation request (4601) if the application has any state (4600).

In response to the installation request, a screen device may download the application (4620). In this case, if there is an installation pause request from a user (4621), the downloading of the application is paused (4622). When an installation continuation request or an installation request is received from the user (4623), the screen device may continue to download the application (4620).

Alternatively, if the user's input is required during the downloading (4624), the screen device may be in the user pending input state in the download process (4625). In this case, the screen device may display that it is in the user pending input state (4626). When an installation request is received along with the user's input (4627), the screen device continues to download the application (4620).

The screen device may be in an installation uncompleted state during downloading (4630) and may become an installing state (4640). In this case, if there is an installation pause request from the user (4641), the installation of the application is paused (4642). When an installation continuation request or an installation request is received from the user (4643), the screen device may continue to install the application (4640).

Alternatively, if the user's input is required during the installation (4644), the screen device may be in the user pending input state in the installation process (4645). In this case, the screen device may display that it is in the user pending input state (4646). When an installation request is received along with the user's input (4647), the screen device may continue to install the application (4640).

When the installation is completed, the screen device becomes an installation completed state (4650).

The various embodiments described in this specification may be implemented in a recording medium readable by a computer or similar devices using software or hardware or a combination of them, for example.

According to a hardware implementation, an embodiment described herein may be implemented using at least one of Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and other electrical units for executing functions. In some cases, the embodiments described in this specification may be implemented using the controller or the control point.

According to a software implementation, embodiments, such as procedures or functions, may be implemented along with a software module for performing at least one function or operation. Software code may be implemented by a software application written in a proper program language. The software code may be stored in the memory and executed by the control unit.

In accordance with an embodiment of the present invention, the aforementioned method may be implemented in a medium on which a program has been recorded in the form of processor-readable code. The processor-readable medium may include ROM, RAM, CD-ROM, a magnetic tape, a floppy disk, and an optical data storage device, for example. Furthermore, the processor-readable medium includes an implementation in the form of carrier waves (e.g., transmission through the Internet).

INDUSTRIAL APPLICABILITY

The configurations and methods of the aforementioned embodiments are not limited and applied to the devices described above, and the embodiments may be constructed by selectively combining part of or the entire of each of the embodiments so that they are modified in various ways.

The invention claimed is:

1. A method for providing a service between applications of a companion device and a broadcast reception device connected over a network, the method which is executed by a processor of the companion device comprising:
    performing a terminal discovery procedure for a discovery of the broadcast reception device;
    performing an application information obtaining procedure for obtaining application information from the broadcast reception device,
    wherein the application information includes address information for at least one service endpoint of the broadcast reception device,
    wherein the application information obtaining procedure comprises:
    transmitting a request message for obtaining the application information to the broadcast reception device, and
    receiving a response message including the application information from the broadcast reception device in response to the request message, and
    wherein the address information included in the application information includes ApptoApp uniform resource locator (URL information for communication between the application of the companion device and the application of the broadcast reception device and synchronization URL information for synchronization between the companion device and the broadcast reception device; and
    performing an ApptoApp connection procedure for establishing a connection for the communication between the application of the companion device and the application of the broadcast reception device by using the ApptoApp URL information,
    wherein the application information obtaining procedure is performed when the application of the broadcast reception device is launched by the companion device,
    wherein the method further comprises performing a synchronization procedure based on the synchronization URL information, and
    wherein the ApptoApp URL information corresponds to a websocket server URL.

2. The method of claim 1, wherein the application information is included in description information of an Extensible Markup Language (XML format.

3. The method of claim 1, wherein:
    the broadcast reception device receives a broadcast signal through at least one of a broadcast and a broadband, and
    the broadcast signal includes at least one of media content, application data, an application information table, and a stream event.

4. A method for providing a service between applications of a companion device and a broadcast reception device connected over a network, the method comprising:
    obtaining an application address of the broadcast reception device;
    transmitting a request message which requests an execution of the application of the broadcast reception device to the application address of the broadcast reception device; and
    receiving a response message from the broadcast reception device in response to the request message,
    wherein the response message includes code information indicative of a state of the execution of the application,
    wherein the code information includes at least one of first code information indicating that the application has been executed, second code information indicating that the application is unable to be executed by a user, third code information indicating that the application is unable to be executed by the broadcast reception device, and fourth code information indicating that the application is unable to be executed due to a state of the broadcast reception device,
    wherein body data of the request message includes an application identifier and application description information, and
    wherein the application description information comprises control code information including at least one of a launch, a stop, and monitoring.

5. The method of claim 4, wherein:
    the broadcast reception device receives a broadcast signal through at least one of a broadcast and a broadband, and the broadcast signal comprises at least one of media content, application data, an application information table, and a stream event.

6. A companion device for managing a connection with a broadcast reception device over a network, the companion device comprising:
 a network interface configured to perform communication with the broadcast reception device; and
 a controller configured to:
 perform a terminal discovery procedure for a discovery of the broadcast reception device,
 perform an application information obtaining procedure for obtaining application information from the broadcast reception device,
 wherein the application information includes address information for at least one service endpoint of the broadcast reception device,
 wherein the application information obtaining procedure comprises:
 transmitting a request message for obtaining the application information to the broadcast reception device, and
 receiving a response message including the application information from the broadcast reception device in response to the request message, and
 wherein the address information included in the application information includes ApptoApp uniform resource locator (URL information for communication between the application of the companion device and the application of the broadcast reception device and synchronization URL information for synchronization between the companion device and the broadcast reception device, and
 perform an ApptoApp connection procedure for establishing a connection for the communication between the application of the companion device and the application of the broadcast reception device by using the ApptoApp URL information,
 wherein the application information obtaining procedure is performed when the application of the broadcast reception device is launched by the companion device,
 wherein the controller is further configured to perform a synchronization procedure based on the synchronization URL information, and
 wherein the ApptoApp URL information corresponds to a websocket server URL.

7. The companion device of claim 6, wherein the application information is included in description information of an Extensible Markup Language (XML) format.

8. The companion device of claim 6, wherein:
 the broadcast reception device receives a broadcast signal through at least one of a broadcast and a broadband, and
 the broadcast signal includes at least one of media content, application data, an application information table, and a stream event.

9. A companion device managing a connection with a broadcast reception device over a network, the companion device comprising:
 a network interface configured to perform communication with the broadcast reception device; and
 a controller configured to obtain an application address of the broadcast reception device, transmit a request message which requests an execution of the application of the broadcast reception device to the application address of the broadcast reception device, and receive a response message from the broadcast reception device in response to the request message,
 wherein the response message includes code information indicative of a state of the execution of the application,
 wherein the code information includes at least one of first code information indicating that the application has been executed, second code information indicating that the application is unable to be executed by a user, third code information indicating that the application is unable to be executed by the broadcast reception device, and fourth code information indicating that the application is unable to be executed due to a state of the broadcast reception device,
 wherein body data of the request message includes an application identifier and application description information, and
 wherein the application description information includes control code information comprising at least one of a launch, a stop, and monitoring.

10. The companion device of claim 9, wherein:
 the broadcast reception device receives a broadcast signal through at least one of a broadcast and a broadband, and
 the broadcast signal comprises at least one of media content, application data, an application information table, and a stream event.

* * * * *